(12) United States Patent
Eckols

(10) Patent No.: US 11,047,493 B2
(45) Date of Patent: Jun. 29, 2021

(54) DIRECTIONAL FLOW CONTROL DEVICE

(71) Applicant: THE BOEING COMPANY, Chicago, IL (US)

(72) Inventor: David Ansyl Eckols, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/587,237

(22) Filed: Sep. 30, 2019

(65) Prior Publication Data

US 2020/0025299 A1 Jan. 23, 2020

Related U.S. Application Data

(63) Continuation-in-part of application No. 15/918,314, filed on Mar. 12, 2018, now Pat. No. 10,704,695.

(51) Int. Cl.
*F16K 31/04* (2006.01)
*F16K 11/08* (2006.01)
(Continued)

(52) U.S. Cl.
CPC .......... *F16K 11/163* (2013.01); *F16K 11/076* (2013.01); *F16K 31/041* (2013.01); *F16K 11/0876* (2013.01); *F16K 31/0603* (2013.01)

(58) Field of Classification Search
CPC ........... Y10T 137/8782; F16K 11/0876; F16K 11/085; F16K 31/041
See application file for complete search history.

(56) References Cited

U.S. PATENT DOCUMENTS 3,581,768 A * 6/1971 Conti .................... F16K 11/072
137/874
4,223,700 A * 9/1980 Jones ...................... E21B 23/12
137/874

(Continued)

FOREIGN PATENT DOCUMENTS

DE           E9002393     ‡  5/1990
DE         102012224061   ‡  6/2014
EP            114005 A    ‡  3/1918  ............ F16K 11/074

OTHER PUBLICATIONS

Extended European Search Report for EP 19161806.5-1015, dated Aug. 9, 2019‡

Primary Examiner — Seth W. Mackay-Smith
(74) Attorney, Agent, or Firm — The Small Patent Law Group LLC; Jay J. Hoette

(57) ABSTRACT

A directional flow control device includes a housing extending along a longitudinal axis between an inlet end and a discharge end. The housing holds stator magnets. The directional flow control device includes a flow deflector received in the housing. The flow deflector is rotatable in the housing about a rotation axis parallel to the longitudinal axis. The flow deflector has a flow channel therethrough. The flow channel has an intake bore at a front end of the flow deflector and a discharge bore at a rear end of the flow deflector. The intake bore is coaxial with the rotation axis. The discharge bore is offset from the rotation axis. The flow deflector has rotor magnets aligned with and facing the stator magnets. The stator magnets are energized to cause rotation of the flow deflector relative to the housing.

20 Claims, 17 Drawing Sheets

(51) Int. Cl.
    *F16K 11/16*         (2006.01)
    *F16K 11/076*     (2006.01)
    *F16K 31/06*         (2006.01)
    *F16K 11/087*     (2006.01)

(56) References Cited

U.S. PATENT DOCUMENTS

| | | | | |
|---|---|---|---|---|
| 4,372,337 A * | 2/1983 | Holzenberger | F16K 11/08 | 137/240 |
| 4,403,626 A * | 9/1983 | Paul, Jr. | F16K 11/0873 | 137/118.07 |
| 4,892,286 A * | 1/1990 | Reinicke | G05D 16/202 | 251/129.05 |
| 4,984,601 A * | 1/1991 | Andersson | F16K 31/0651 | 137/486 |
| 5,156,504 A * | 10/1992 | Stich | B23Q 1/0018 | 137/625.46 |
| 5,291,911 A * | 3/1994 | Bernal | F16L 55/02754 | 137/1 |
| 5,329,968 A * | 7/1994 | Powell | F16K 11/072 | 137/625.46 |
| 6,085,786 A * | 7/2000 | Forsythe | F16K 3/085 | 137/624.13 |
| 6,240,946 B1 * | 6/2001 | Beasley | C10B 31/12 | 137/15.06 |
| 6,318,645 B1 * | 11/2001 | Robinson | A01C 23/007 | 222/330 |
| 6,880,802 B2 * | 4/2005 | Hara | F16K 3/08 | 137/315.17 |
| 6,920,846 B2 * | 7/2005 | Pawellek | F01P 5/10 | 123/41.44 |
| 7,343,933 B2 * | 3/2008 | McBeth | F16K 11/074 | 137/625.11 |
| 7,631,661 B2 * | 12/2009 | Moreno | F16K 11/074 | 137/625.43 |
| 7,753,014 B2 * | 7/2010 | Fitzgerald | F01L 9/02 | 123/90.12 |
| 8,100,381 B2 * | 1/2012 | Roschke | F23N 1/005 | 251/129.11 |
| 8,424,842 B2 * | 4/2013 | Bussear | F16K 1/2014 | 251/252 |
| 8,820,356 B2 * | 9/2014 | Kannoo | F16K 11/074 | 137/625.43 |
| 8,844,569 B2 * | 9/2014 | Lin | F16K 31/041 | 137/625.45 |
| 8,931,502 B2 * | 1/2015 | Allidieres | F16K 11/074 | 137/79 |
| 9,140,370 B2 * | 9/2015 | Kannoo | F16K 11/074 | |
| 9,334,967 B2 * | 5/2016 | Larsen | F16K 31/041 | |
| 9,377,121 B2 * | 6/2016 | Burgess | F16K 31/055 | |
| 9,695,734 B2 * | 7/2017 | Carns | F16K 5/0605 | |
| 9,732,865 B2 * | 8/2017 | Henke | B65G 53/56 | |
| 10,161,539 B1 * | 12/2018 | Lin | F16K 5/04 | |
| 2005/0236049 A1 ‡ | 10/2005 | Manson | F16K 11/072 | 137/62 |
| 2016/0061498 A1 * | 3/2016 | Larsen | B23P 15/001 | 62/498 |

\* cited by examiner
‡ imported from a related application

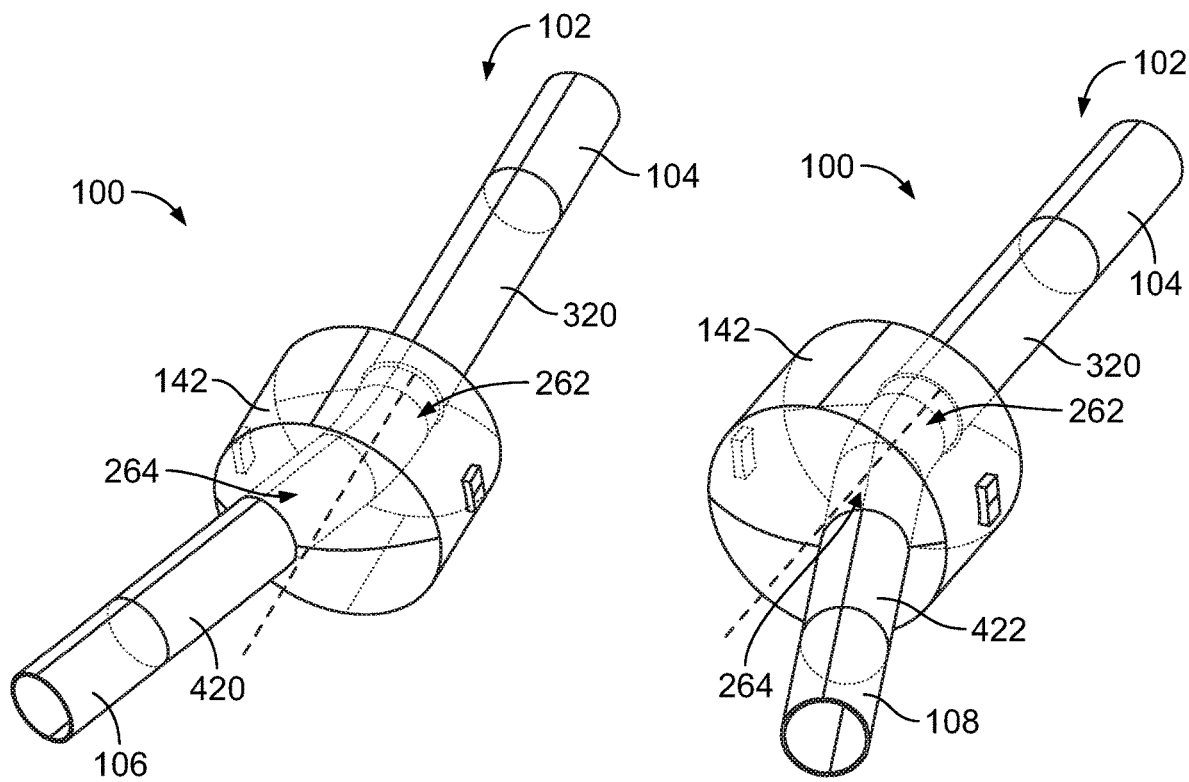
FIG. 12
FIG. 13
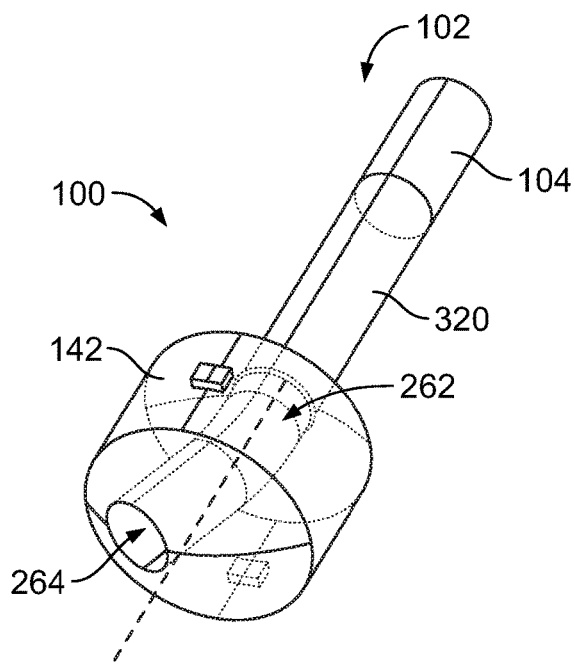
FIG. 14

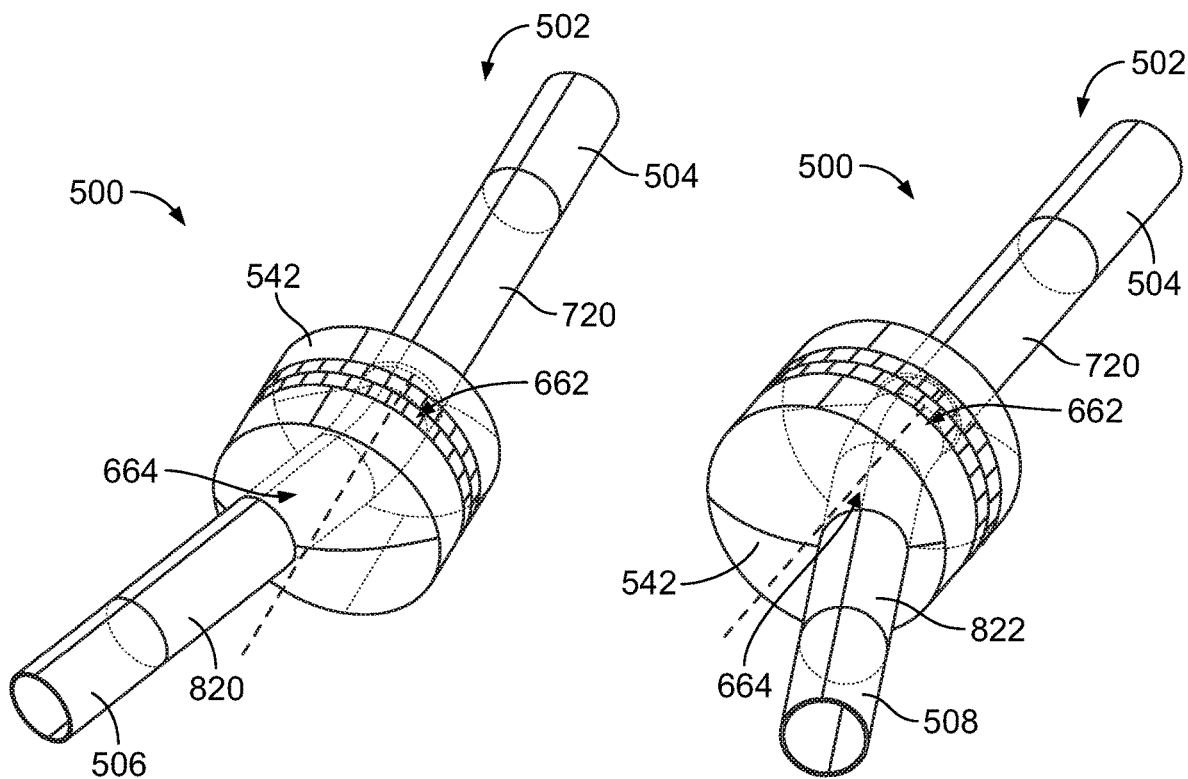
FIG. 28
FIG. 29
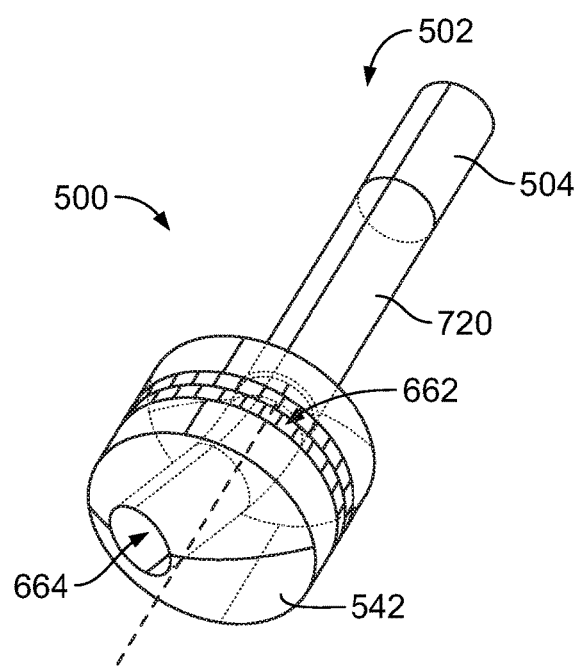
FIG. 30

DIRECTIONAL FLOW CONTROL DEVICE

RELATED APPLICATIONS

This application is a continuation-in-part of U.S. patent application Ser. No. 15,918,314, entitled "DIRECTIONAL FLOW CONTROL DEVICE," filed Mar. 12, 2018, which is hereby incorporated by reference in its entirety.

BACKGROUND

The present disclosure relates generally to a directional flow control device and methods of assembling a directional flow control device.

Flow control devices are used to control fluid flow in various systems. For example, in vehicles, such as aircraft, flow control devices are used to control fuel flow or hydraulic fluid flow, such as in flight control systems. Typical flow control devices are directional valves to change flow direction, such as into different channels or pipes. Other types of flow control devices are shut-off valves that are operated to either allow flow or shut-off flow in the system. Some systems utilize both shut-off valves and directional valves within the system. Conventional flow control devices tend to be heavy and bulky, occupy significant space in the system, such as in the aircraft, and are expensive due to manufacturing complexity.

Conventional flow control devices use a rotating bearing with channels to direct the flow within the flow control device. The rotating bearing is rotated by a motor utilizing a set of planetary gears to achieve the torque needed to rotate the bearing. The planetary gears are expensive and require maintenance and replacement. The rotating bearing of conventional flow control devices is typically rotated around an axis that is generally perpendicular to the channels allowing fluid flow therethrough. The inlet and the outlet channels of the rotating bearing of conventional flow control devices are typically angled at either a 45° angle or 90° angle relative to each other and have significant pressure loss due to the high angle of deflection of the fluid.

SUMMARY

In accordance with one example, a directional flow control device is provided. The directional flow control device includes a housing extending along a longitudinal axis between an inlet end and a discharge end. The housing holds stator magnets. The directional flow control device includes a flow deflector received in the housing. The flow deflector is rotatable in the housing about a rotation axis parallel to the longitudinal axis. The flow deflector has a flow channel therethrough. The flow channel has an intake bore at a front end of the flow deflector and a discharge bore at a rear end of the flow deflector. The intake bore is coaxial with the rotation axis. The discharge bore is offset from the rotation axis. The flow deflector has rotor magnets aligned with and facing the stator magnets. The stator magnets are energized to cause rotation of the flow deflector relative to the housing.

In accordance with another example, a directional flow control device is provided. The directional flow control device includes a housing including a shell having a cavity, a front housing in the cavity, and a rear housing in the cavity. The front housing has a front pocket and an inlet bore open to the front pocket. The rear housing has a rear pocket, a first outlet bore open to the rear pocket and a second outlet bore open to the rear pocket. The front housing and the rear housing are aligned in the cavity along a longitudinal axis extending between an inlet end and an outlet end of the directional flow control device. The directional flow control device includes stator magnets coupled to at least one of the front housing or the rear housing. A control module is coupled to the stator magnets to energize the stator magnets. The directional flow control device includes a flow deflector including a hub having a front end and a rear end. The front end is positioned in the front pocket. The rear end is positioned in the rear pocket. The flow deflector has rotor magnets arranged around an outer perimeter of the hub. The flow deflector has a flow channel therethrough. The flow channel has an intake bore at a front end of the flow deflector. The flow channel has a discharge bore at a rear end of the flow deflector. The flow deflector is positioned between the front housing and the rear housing such that the rotor magnets are aligned with the stator magnets. The intake bore is in flow communication with the inlet bore. The hub is rotatable relative to the front housing and the rear housing about a rotation axis parallel to the longitudinal axis. The hub is rotated about the rotation axis between a first discharge position and a second discharge position based on energization of the stator magnets by the control module. The discharge bore is in fluid communication with the first outlet bore when the hub is at the first discharge position and the discharge bore is in fluid communication with the second outlet bore when the hub is at the second discharge position.

In accordance with a further example, a method of assembling a directional flow control device is provided. The method provides a shell having a cavity between a front end and a rear end. The method positions a front housing in the cavity. The front housing has a front pocket and an inlet bore open to the front pocket. The method positions a rear housing in the cavity. The rear housing has a rear pocket, a first outlet bore open to the rear pocket and a second outlet bore open to the rear pocket. The front housing and the rear housing are aligned in the cavity along a longitudinal axis that extends between an inlet end and an outlet end of the directional flow control device. The method couples stator magnets to at least one of the front housing or the rear housing. The stator magnets are operably coupled to a control circuit to energize the stator magnets. The method provides a flow deflector having a hub with a front end and a rear end. The front end is positioned in the front pocket. The rear end is positioned in the rear pocket. The flow deflector has a flow channel therethrough. The flow channel has an intake bore at a front end of the flow deflector. The flow channel has a discharge bore at a rear end of the flow deflector. The flow deflector has rotor magnets arranged around an outer perimeter of the hub. The method positions the flow deflector between the front housing and the rear housing such that the rotor magnets are aligned with the stator magnets. The intake bore is in flow communication with the inlet bore. The hub is rotatable relative to the front housing and the rear housing about a rotation axis coaxial with the intake bore and the rotation axis being parallel to the longitudinal axis. The hub is rotated about the rotation axis between a first discharge position and a second discharge position based on energization of the stator magnets. The discharge bore is configured to be in fluid communication with the first outlet bore when the hub is at the first discharge position and the discharge bore is configured to be in fluid communication with the second outlet bore when the hub is at the second discharge position.

In accordance with a further example, a method is provided of using a directional flow control device having a flow deflector received in a housing, the flow deflector including a flow channel extending between an intake bore and a discharge bore, the housing including an inlet bore, a first outlet bore and a second outlet bore, the housing including stator magnets, the flow deflector including rotor magnets, the directional flow control device including a control circuit operably coupled to the stator magnets. The method includes operating the control circuit to energize the stator magnets to rotate the rotor magnets and the flow deflector in the housing to a first discharge position with the discharge bore being in flow communication with the first outlet bore in the first discharge position. The method includes operating the control circuit to energize the stator magnets to rotate the rotor magnets and the flow deflector in the housing to a second discharge position with the discharge bore being in flow communication with the second outlet bore in the second discharge position. The method may include operating the control circuit to energize the stator magnets to rotate the rotor magnets and the flow deflector in the housing to a shut-off position with the discharge bore is in flow communication with neither the first outlet bore nor the second outlet bore in the shut-off position.

The features and functions that have been discussed can be achieved independently in various examples or may be combined in yet other examples, further details of which can be seen with reference to the following description and drawings.

BRIEF DESCRIPTION OF THE DRAWINGS

FIG. 12 is a perspective view of a portion of the directional flow control device showing the flow deflector in a first discharge position.

FIG. 13 is a perspective view of a portion of the directional flow control device showing the flow deflector in a second discharge position.

FIG. 14 is a perspective view of a portion of the directional flow control device showing the flow deflector in a shut-off position.

FIG. 28 is a perspective view of a portion of the directional flow control device showing the flow deflector in a first discharge position.

FIG. 29 is a perspective view of a portion of the directional flow control device showing the flow deflector in a second discharge position.

FIG. 30 is a perspective view of a portion of the directional flow control device showing the flow deflector in a shut-off position.

DETAILED DESCRIPTION

Figure 1:
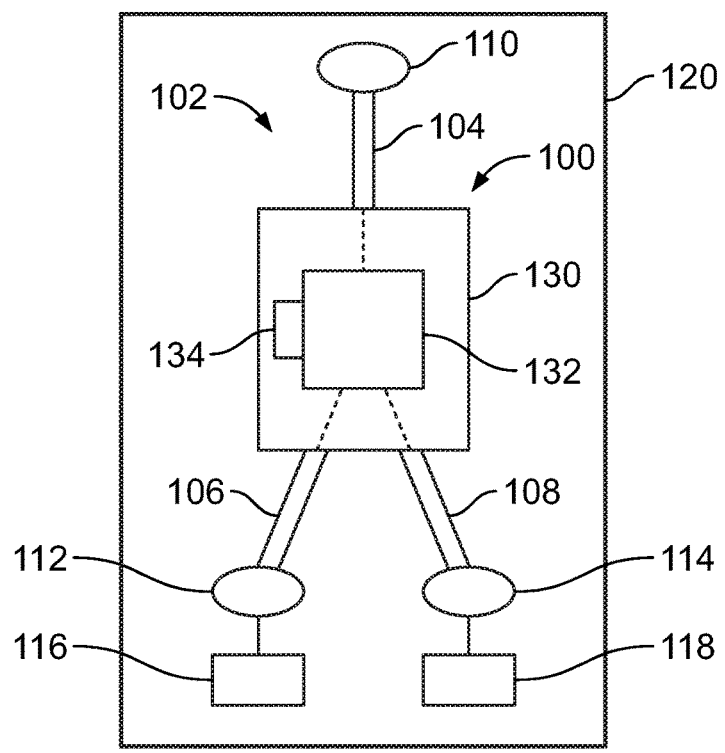
FIG. 1 is a schematic view of a directional flow control device in accordance with an example.

The following detailed description of certain examples will be better understood when read in conjunction with the appended drawings. It should be understood that the various examples are not limited to the arrangements and instrumentality shown in the drawings.

FIG. 1 is a schematic view of a directional flow control device 100 in accordance with an example for use in a fluid system 102. The directional flow control device 100 controls fluid flow in the fluid system 102. The fluid system 102 includes at least one supply lines and at least one discharge line coupled to the directional flow control device 100. For example, in the illustrated example, the fluid system 102 includes a first supply line 104, a first discharge line 106 and a second discharge line 108. In an example, the first supply line 104 is coupled to a first supply reservoir 110, the first discharge line 106 is coupled to a first discharge reservoir 112 and the second discharge line 108 is coupled to a second discharge reservoir 114. The directional flow control device 100 is used to control flow between the first supply reservoir 110 and the first and second discharge reservoirs 112, 114. For example, the directional flow control device 100 may control fluid flow therethrough from the first supply line 104 to the first discharge line 106 or the second discharge line 108. In various examples, the fluid system 102 may include more than one supply line 104 and/or more than one supply reservoir 110. Optionally, the directional flow control device 100 may be operable in a shut-off state where the directional flow control device 100 restricts fluid flow to the first discharge line 106 and the second discharge line 108. In alternative examples, the flow through the directional flow control device may be reversed such that the reservoirs 112, 114 are supply reservoirs and the reservoir 110 is a discharge reservoir; however, the description of the directional flow control device herein is with reference to the supply and discharge arrangement illustrated in FIG. 1.

The first discharge reservoir 112 may be coupled to a first working component 116 and the second discharge reservoir 114 may be coupled to a second working component 118. The fluid is used by the first and second working components 116, 118 for one or more functions or operations. For example, in an example, the fluid system 102 may be used in a vehicle, such as an aircraft 120. By way of example, the fluid system 102 may be a fuel supply system and the directional flow control device 100 may be used to control supply of fuel from the first supply reservoir 110 to the various first and second discharge reservoirs 112, 114. The first and second working components 116, 118 may be fuel pumps in such examples. By way of example, the fluid system 102 may be a flight control system, such as for controlling a position of a rudder or a flap, and the directional flow control device 100 may be used to control supply of hydraulic fluid within the fluid system 102, such as for moving the rudder or the flap. The first and second working components 116, 118 may be hydraulic actuators in such examples. By way of example, the fluid system 102 may be a landing gear control system, such as for controlling a position of the landing gear of the aircraft 120, and the directional flow control device 100 may be used to control supply of hydraulic fluid within the landing gear control system to raise or lower the landing gear of the aircraft 120. The fluid system 102 may be used in other subsystems of the aircraft 120 in alternative examples. The fluid system 102 may be used in other types of vehicles other than aircraft in alternative examples. The fluid system 102 may be used in non-vehicle applications, such as industrial applications, in alternative examples.

In an example, the directional flow control device 100 includes a shell 130, a flow assembly 132 received in the shell 130 and a driver assembly 134 received in the shell 130. The flow assembly 132 is fluidly coupled to the supply line 104 and the first and second discharge lines 106, 108. The driver assembly 134 is operably coupled to the flow assembly 132 to control operation of the flow assembly 132, such as by moving the flow assembly 132 to different discharge positions to control flow to the first discharge line 106 or the second discharge line 108. Optionally, the driver assembly 134 may be operated to move the flow assembly 132 to a shut-off position to stop flow through the fluid system 102.

Figure 2:
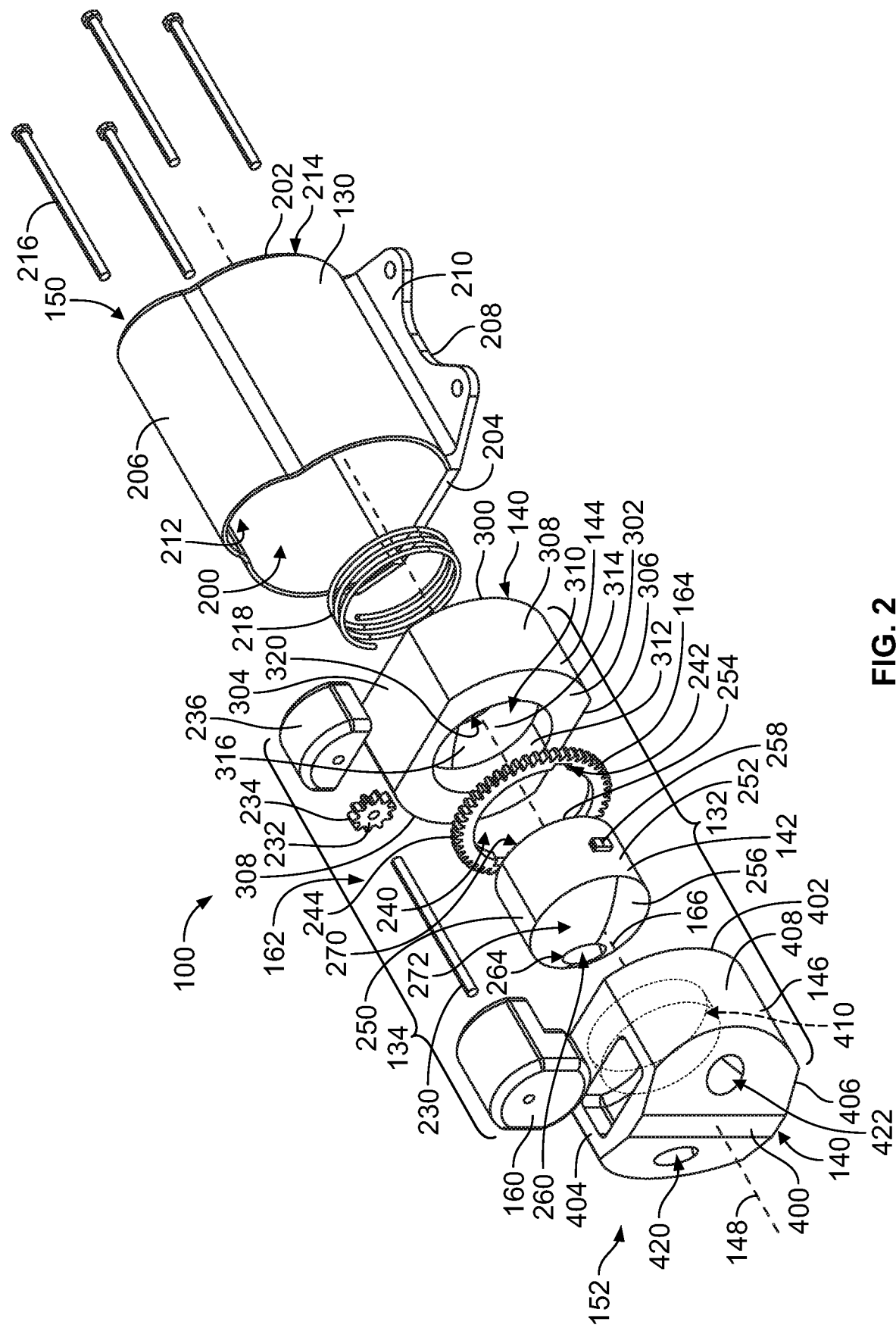
FIG. 2 is an exploded view of the directional flow control device in accordance with an example.

FIG. 2 is an exploded view of the directional flow control device 100 in accordance with an example. The directional flow control device 100 includes the shell 130, the flow assembly 132 and the driver assembly 134. In an example, the flow assembly 132 includes a housing 140 and a flow deflector 142 received in the housing 140. In the illustrated example, the housing 140 is a multi-piece housing including a front housing 144 and a rear housing 146. The flow deflector 142 is configured to be captured between the front housing 144 and the rear housing 146. The flow deflector 142, the front housing 144 and the rear housing 146 are configured to be received in the shell 130 along a longitudinal axis 148. In an example, the flow deflector 142 is rotatably received within the front housing 144 and the rear housing 146 to control flow through the directional flow control device 100. The housing 140 extends between an inlet end 150 and a discharge end 152 opposite the inlet end 150. The inlet end 150 and the discharge end 152 are arranged along the longitudinal axis 148.

In an example, the driver assembly 134 includes a motor 160 and an actuator 162 driven by the motor 160. The actuator 162 is used to move the flow deflector 142. In an example, the driver assembly 134 includes a gear 164 coupled to the flow deflector 142. The actuator 162 engages and drives the gear 164 to rotate the flow deflector 142 about a rotation axis 166 parallel to the longitudinal axis 148.

The shell 130 includes body defining a cavity 200 extending between a front 202 and a rear 204 of the shell 130. The cavity 200 receives the flow assembly 132. The body may be manufactured from a metal material or a durable plastic material to protect the other components of the directional flow control device 100. The body may be thin to reduce weight of the directional flow control device 100. The shell 130 includes a top 206 and the bottom 208 opposite the top 206. In an example, the shell 130 includes a mounting flange 210 at the bottom 208 for mounting the directional flow control device 100 to another component or structure, such as within the aircraft 120. The mounting flange 210 may be provided at other locations in alternative examples. In an example, the cavity 200 includes a channel 212 at the top 206 that receives at least a portion of the driver assembly 134. The channel 212 may be narrower than the cavity 200 to reduce the overall size of the directional flow control device 100.

In an example, the cavity 200 is open at the rear 204 to receive the components of the directional flow control device 100. Optionally, a cover (not shown) may be coupled to the shell 130 at the rear 204 to close the cavity 200, such as to hold the flow assembly 132 in the cavity 200. In an example, the shell 130 includes an end wall 214 (shown in FIG. 5) at the front 202. In various examples, the flow assembly 132 is coupled to the end wall 214. For example, in the illustrated example, the directional flow control device 100 includes fasteners 216 used to secure the flow assembly 132 to the shell 130. In an example, the fasteners 216 are configured to pass through the front housing 144 and are configured to be threadably coupled to the rear housing 146. For example, the rear housing 146 is fixed to the end wall 214 of the shell 130 by the fasteners 216. The front housing 144 may be axially movable along the fasteners 216 relative to the rear housing 146 and the shell 130. For example, in an example, the directional flow control device 100 includes a biasing spring 218 configured to engage the front housing 144 and the end wall 214 of the shell 130 to bias the front housing 144 toward the rear housing 146. The flow deflector 142 is captured between the front housing 144 and the rear housing 146. The biasing spring 218 sealingly compresses the front housing 144 against the flow deflector 142.

The driver assembly 134 is configured to be received in the cavity 200, such as in the channel 212. In an example, the motor 160 of the driver assembly 134 is an electric motor. The actuator 162 includes a driveshaft 230 and a pinion gear 232 coupled to the driveshaft 230 and rotated by the driveshaft 230. The pinion gear 232 includes gear teeth 234 around the outer perimeter of the pinion gear 232. The pinion gear 232 is configured to engage the gear 164 to rotate the flow deflector 142. Other types of actuators 162 may be used in alternative examples. In an example, the driver assembly 134 includes a bearing 236 for supporting the driveshaft 230. In an example, the motor 160 and the bearing 236 are configured to be mounted to the driver assembly 134, such as to the rear housing 146 and the front housing 144, respectively. In other various examples, the motor 160 and/or the bearing 236 may be mounted to the shell 130.

The gear 164 includes an opening 240 that receives the flow deflector 142. In various examples, the gear 164 includes one or more locking features 242 configured to engage the flow deflector 142 and lock the gear 164 to the flow deflector 142 against relative rotation. In various examples, the locking feature 242 is a slot formed along the interior surface of the gear 164; however, other types of locking features may be provided in alternative examples. The gear 164 includes gear teeth 244 around the outer perimeter of the gear 164. The gear teeth 244 are configured to interface with the gear teeth 234 of the pinion gear 232 to drive rotation of the gear 164. In an example, the gear 164 is configured to be coaxial with the flow deflector 142. The gear 164 is configured to be coaxial with the rotation axis 166 of the flow deflector 142.

The flow deflector 142 includes a cylindrical hub 250 having a cylindrical outer perimeter 252. The flow deflector 142 extends between a front end 254 and a rear end 256. In an example, the flow deflector 142 includes one or more locking features 258 for locking the gear 164 to the hub 250, such as for locking to the locking features 242 of the gear 164. In various examples, the locking feature 258 is a protrusion or tab extending from the outer perimeter 252. Other types of locking features 258 may be provided in alternative examples, such as a groove or channel.

The flow deflector 142 includes a flow channel 260 extending therethrough. The flow channel 260 includes an intake bore 262 (shown in FIG. 7) and a discharge bore 264. The intake bore 262 is open at the front end 254 and the discharge bore 264 is open at the rear end 256. In an example, the intake bore 262 is coaxial with the rotation axis 166 and the discharge bore 264 is offset from the rotation axis 166. For example, the discharge bore 264 is angled nonparallel to the intake bore 262.

In an example, the front end 254 has a convex, curved profile defining a front sealing surface 270 configured to seal against the front housing 144. The rear end 256 has a convex, curved profile defining a rear sealing surface 272 configured to seal against the rear housing 146. In other various examples, the front end 254 and/or the rear end 256 may be flat rather than being curved or may have other shapes in alternative examples.

The front housing 144 extends along the longitudinal axis 148 between a front end 300 and an inner end 302. The inner end 302 is configured to face the rear housing 146. The front housing 144 includes a top 304 and a bottom 306 extending between the front end 300 and the inner end 302. In various examples, the top 304 and/or the bottom 306 may be flat for engagement with and support by the shell 130. For example, the flat surfaces may resist rotation of the rear housing 146 relative to the shell 130. The front housing 144 includes sides 308 extending between the top 304 and the bottom 306. In various examples, the sides 308 are curved; however, the sides 308 may have other shapes in alternative examples.

The front housing 144 includes a front pocket 310 configured to receive the flow deflector 142. The front pocket 310 is sized and shaped to receive the front end 254 of the flow deflector 142. In an example, the front pocket 310 is defined by one or more sidewalls 312 and an end wall 314. The end wall 314 defines a front sealing surface 316 of the front pocket 310. The end wall 314 has a complementary shape to the front end 254 of the flow deflector 142. For example, the end wall 314 may have a concave, curved profile defining the front sealing surface 316. In an example, the sidewall 312 is circular and allows rotation of the flow deflector 142 in the front pocket 310. The sidewall 312 supports a portion of the hub 250.

The front housing 144 includes an inlet bore 320 between the end wall 314 and the front end 300. The inlet bore 320 is configured to be in flow communication with the supply line 104 (shown in FIG. 1). In an example, the inlet bore 320 is coaxial with the longitudinal axis 148. The inlet bore 320 is configured to be in flow communication with the intake bore 262 of the flow deflector 142. For example, the inlet bore 320 and the intake bore 262 are aligned along the rotation axis 166. Optionally, the inlet bore 320 may be threaded to receive the supply line 104 or a coupling on the supply line 104. Alternatively, the supply line 104 may be soldered to the inlet bore 320.

The rear housing 146 extends along the longitudinal axis 148 between a rear end 400 and an inner end 402. The inner end 402 is configured to face the front housing 144. The rear housing 146 includes a top 404 and a bottom 406 extending between the rear end 400 and the inner end 402. In various examples, the top 404 and/or the bottom 406 may be flat for engagement with and support by the shell 130. For example, the flat surfaces may resist rotation of the rear housing 146 relative to the shell 130. The rear housing 146 includes sides 408 extending between the top 404 and the bottom 406. In various examples, the sides 408 are curved; however, the sides 408 may have other shapes in alternative examples.

The rear housing 146 includes a rear pocket 410 (shown in phantom) configured to receive the flow deflector 142. The rear pocket 410 is sized and shaped to receive the rear end 256 of the flow deflector 142. In an example, the rear pocket 410 is defined by one or more side walls and an end wall. The end wall defines a rear sealing surface 416 of the rear pocket 410. The end wall has a complementary shape to the rear end 256 of the flow deflector 142. For example, the end wall may have a concave, curved profile defining the rear sealing surface 416. In an example, the sidewall is circular and allows rotation of the flow deflector 142 in the rear pocket 410. The sidewall supports a portion of the hub 250.

The rear housing 146 includes a first outlet bore 420 between the end wall and the rear end 400 and a second outlet bore 422 between the end wall and the rear end 400. The first and second outlet bores 420, 422 are configured to be in flow communication with the discharge lines 106, 108 (shown in FIG. 1), respectively. The first and second outlet bores 420, 422 are configured to be in flow communication with the discharge bore 264 of the flow deflector 142 depending on the orientation of the flow deflector 142 relative to the rear housing 146. In an example, the first and second outlet bores 420, 422 are angled relative to each other. The first and second outlet bores 420, 422 are angled relative to the longitudinal axis 148. Optionally, the first and second outlet bores 420, 422 may be threaded to receive the first and second discharge lines 106, 108 or couplings on the first and second discharge lines 106, 108. Alternatively, the first and second discharge lines 106, 108 may be soldered to the first and second outlet bores 420, 422.

Figure 3:
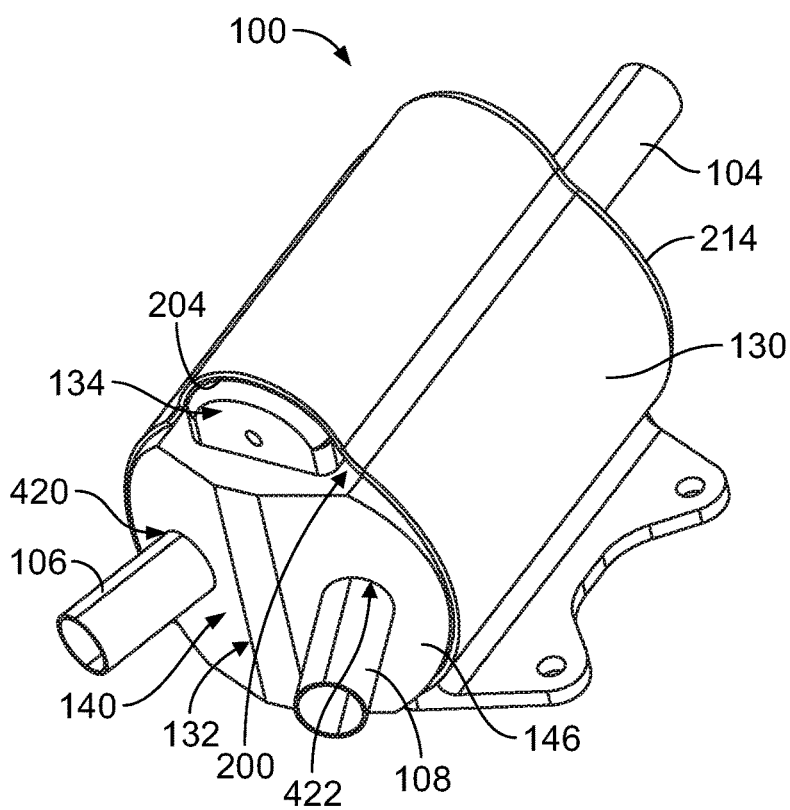
FIG. 3 is a perspective view of the directional flow control device in accordance with an example.
Figure 4:
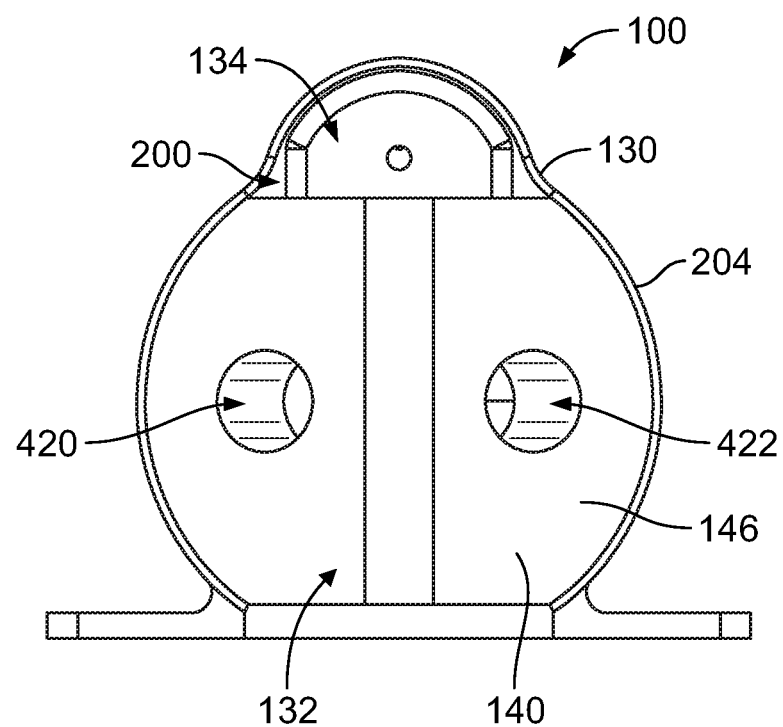
FIG. 4 is a rear view of the directional flow control device.
Figure 5:
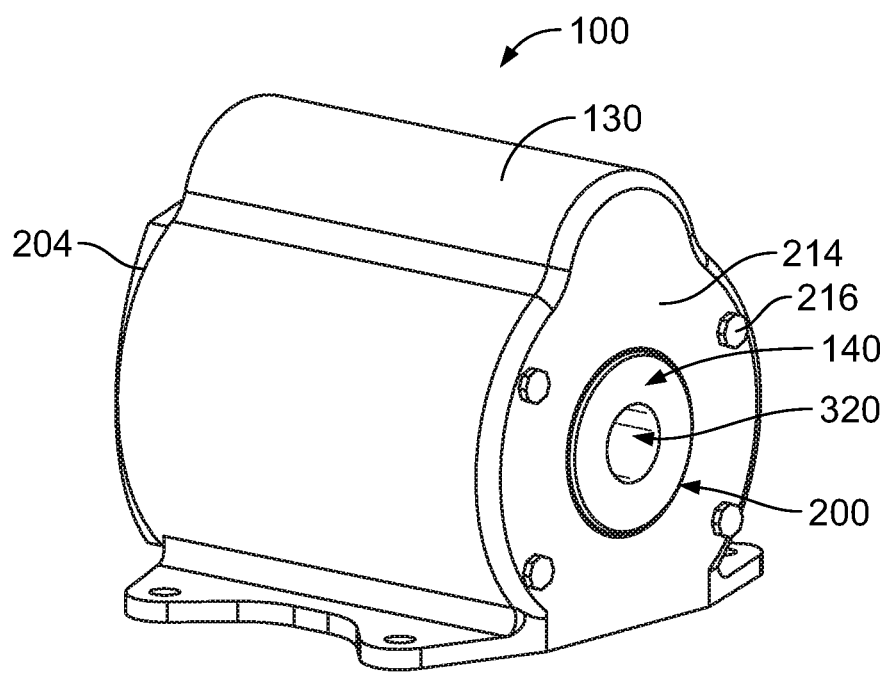
FIG. 5 is a front perspective view of the directional flow control device.

FIG. 3 is a perspective view of the directional flow control device 100 in accordance with an example showing the supply line 104 coupled to the directional flow control device 100 and showing the first and second discharge lines 106, 108 coupled to the directional flow control device 100. FIG. 4 is a rear view of the directional flow control device 100. FIG. 5 is a front perspective view of the directional flow control device 100.

During assembly, the flow assembly 132 and the driver assembly 134 are loaded into the cavity 200 of the shell 130. For example, the driver assembly 134 may be mounted to the housing 140 and loaded into the cavity 200 through the rear 204. The fasteners 216 (FIG. 5) are coupled to the housing 140 to secure the housing 140 in the shell 130. In an example, the shell 130 includes an opening 220 (FIG. 5) in the end wall 214 that provides access to the rear housing 146. The supply line 104 (FIG. 3) is coupled to the rear housing 146 at the inlet bore 320 (FIG. 5). The first and second discharge lines 106, 108 (FIG. 3) are coupled to the first and second outlet bores 420, 422 (FIG. 4). The directional flow control device 100 controls fluid flow from the supply line 104 to the first and second discharge lines 106, 108 through the flow assembly 132.

Figure 6:
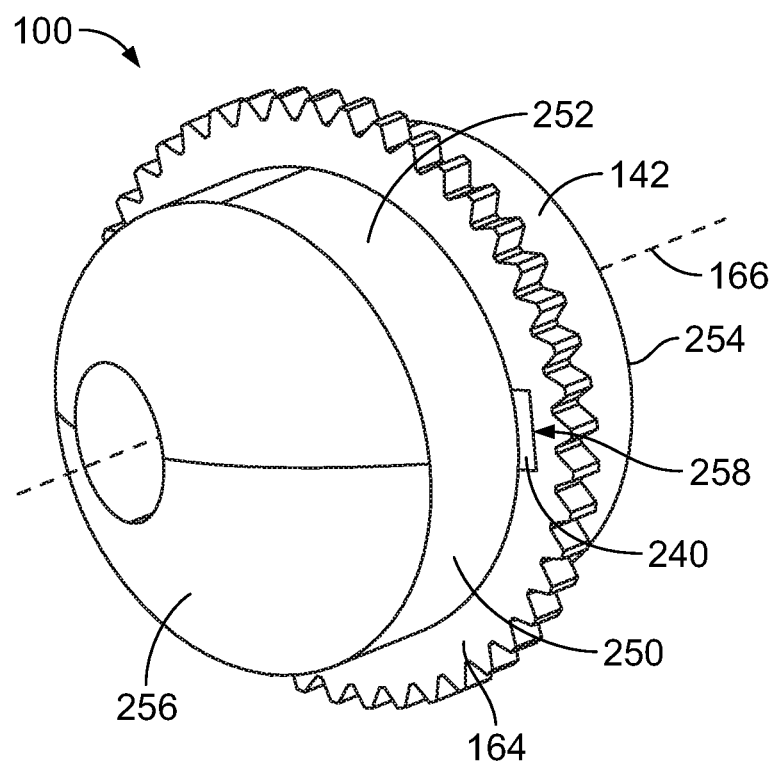
FIG. 6 is a rear perspective view of a portion of the directional flow control device showing a flow deflector and a gear in accordance with an example.
Figure 7:
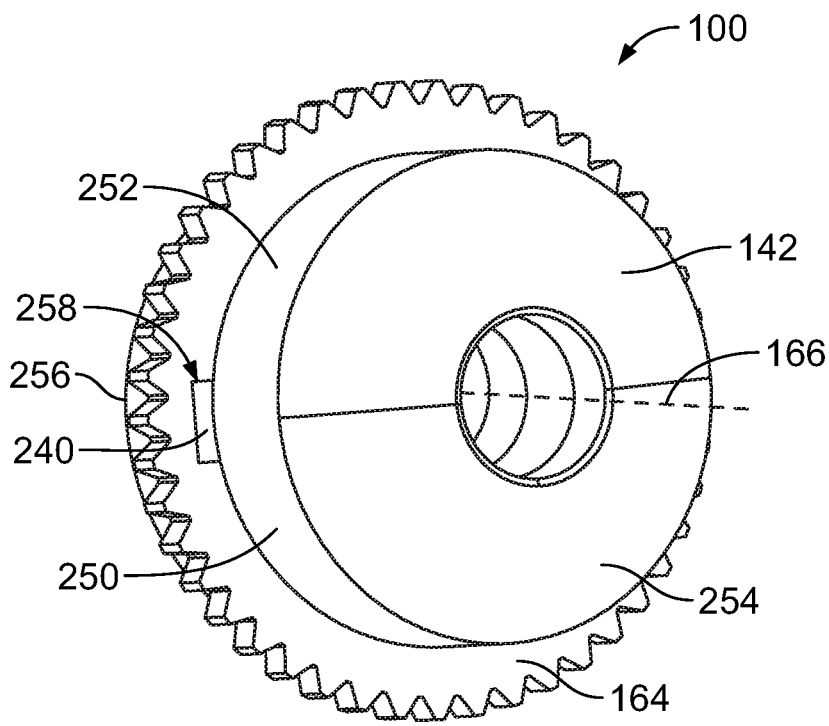
FIG. 7 is a front perspective view of a portion of the directional flow control device showing the flow deflector and the gear.

FIG. 6 is a rear perspective view of a portion of the directional flow control device 100 showing the flow deflector 142 and the gear 164 in accordance with an example. FIG. 7 is a front perspective view of a portion of the directional flow control device 100 showing the flow deflector 142 and the gear 164. During assembly, the gear 164 is coupled to the flow deflector 142. For example, the hub 250 is received in the opening 240. The locking features 242 to interact with the locking features 258 to lock the gear 164 to the hub 250 against relative rotation. Rotation of the gear 164 by the driver assembly 134 (shown in FIG. 2) causes rotation of the flow deflector 142. The flow deflector 142 extends between the front end 254 and the rear end 256 along the rotation axis 166. The gear 164 is coaxial with the hub 250 along the rotation axis 166.

In an alternative example, rather than having the gear 164 and the flow deflector 142 separate and discrete and coupled together, the gear 164 may be formed integral with the flow deflector 142. For example, the outer perimeter 252 of the hub 250 may have gear teeth formed thereon. For example, the gear teeth may be machined around the outer perimeter 252 or the gear teeth may be molded integral with the hub 250.

Figure 8:
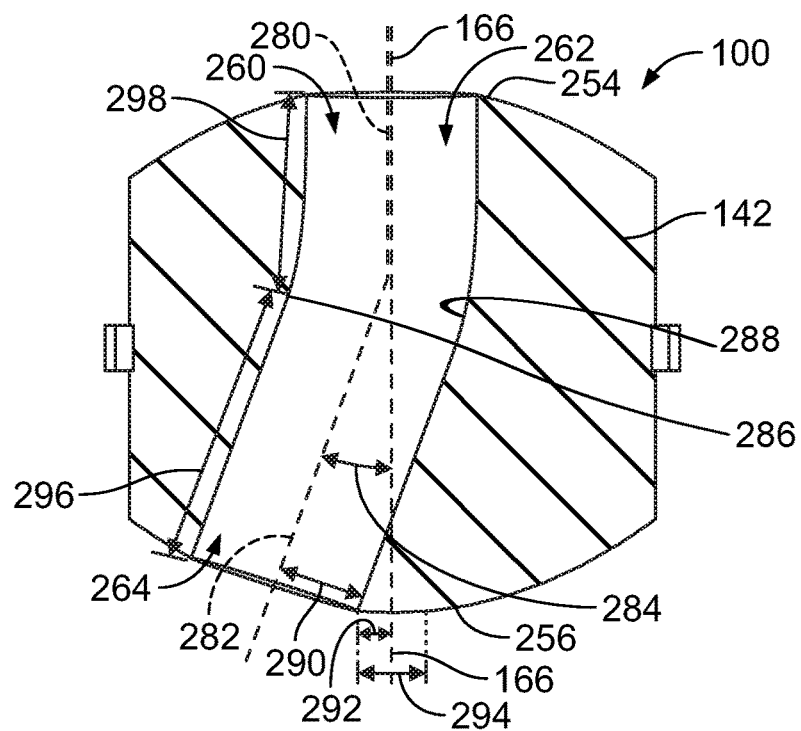
FIG. 8 is a cross-sectional view of the flow deflector in accordance with an example.

FIG. 8 is a cross-sectional view of the flow deflector 142 in accordance with an example. The flow channel 260 is shown extending through the flow deflector 142 in a direction generally parallel to fluid flow through the directional flow control device 100, such as between the front end 254 and the rear end 256. The intake bore 262 extends along an intake bore axis 280 and the discharge bore 264 extends along a discharge bore axis 282. The intake bore axis 280 is parallel to the rotation axis 166.

The discharge bore axis 282 is angled relative to the intake bore axis 280 and a fluid path change angle 284. In an example, the fluid path change angle 284 between the discharge bore axis 282 and the intake bore axis 280 is less than 45°. In various examples, the fluid path change angle 284 between the discharge bore axis 282 and the intake bore axis 280 is between approximately 10° and approximately 30°. In the illustrated example, the fluid path change angle 284 between the discharge bore axis 282 and the intake bore axis 280 is approximately 20°. The flow channel 260 has an inner bend 286 and an outer bend 288 between the intake bore 262 and the discharge bore 264. The inner bend 286 and the outer bend 288 are curved to provide a smooth transition between the intake bore 262 and the discharge bore 264. Providing the smooth transition and the small fluid path change angle 284 (for example, less than) 45° allows for efficient fluid flow through the flow deflector 142. For example, the smooth transition reduces the risk of cavitation at the inner bend 286 and/or the outer bend 288. Having a relatively long inner bend 286 and/or outer bend 288, rather than an abrupt corner, allows for efficient fluid flow through the flow deflector 142. The small fluid path change angle 284 has a low efficiency knock down factor for the fluid flow through the fluid system 102. The efficiency knock down factor is a knock down factor of the efficiency of the fluid path and is a function of the bend angle of the fluid path. In various examples, the fluid path change angle 284 may have an efficiency knock down factor of less than 0.5, such as between 0.1 and 0.5. In the illustrated example, the fluid path change angle 284 has an efficiency knock down factor of less than 0.3, such as between 0.2 and 0.3. In various examples, the fluid path change angle 284 may have an efficiency knock down factor of less than half the efficiency knock down factor of a 45° deflection angle.

In an example, the discharge bore 264 has a radius 290. The discharge bore 264, at the rear end 256, is spaced from the rotation axis 166 by a distance 292 less than the radius 290. The distance 292 corresponds to the positioning of the first and second outlet bores 420, 422 (shown in FIG. 2). When the flow deflector 142 is rotated 180°, the discharge bore 264 may be aligned with the respective first and second outlet bores 420, 422. The distance 292 corresponds to a spacing 294 between the first and second outlet bores 420, 422. For example, the spacing 294 is twice the distance 292. The spacing 294 may be selected for manufacturability of the rear housing 146 (shown in FIG. 2). Having the spacing 294 narrow corresponds to a narrow distance 292. The distance 292 corresponds to the fluid path change angle 284. For example, having a narrow distance 292 reduces the fluid path change angle 284, thus reducing the efficiency knock down factor of the flow channel 260, which affects the pressure loss through the directional flow control device 100. A length 296 of the discharge bore 264 and a length 298 of the intake bore 262 affects the fluid path change angle 284. For example, having longer lengths 296, 298 reduces the fluid path change angle 284, thus reducing the efficiency knock down factor of the flow channel 260, which affects the pressure loss through the directional flow control device 100. However, increasing the lengths 296, 298 may add material cost and weight, which may be undesirable in some applications.

Figure 9:
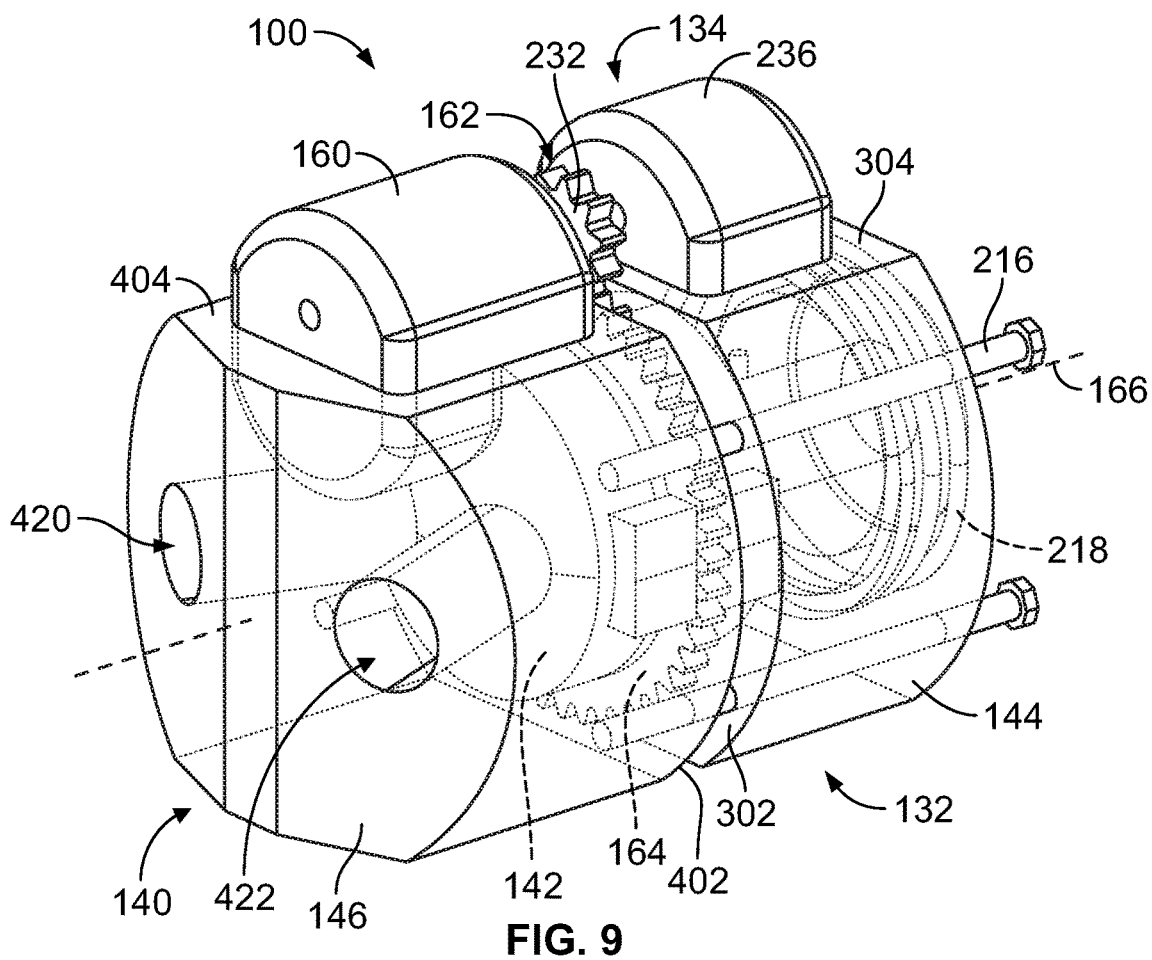
FIG. 9 is a rear perspective view of a portion of the directional flow control device in accordance with an example showing a flow assembly and a driver assembly.
Figure 10:
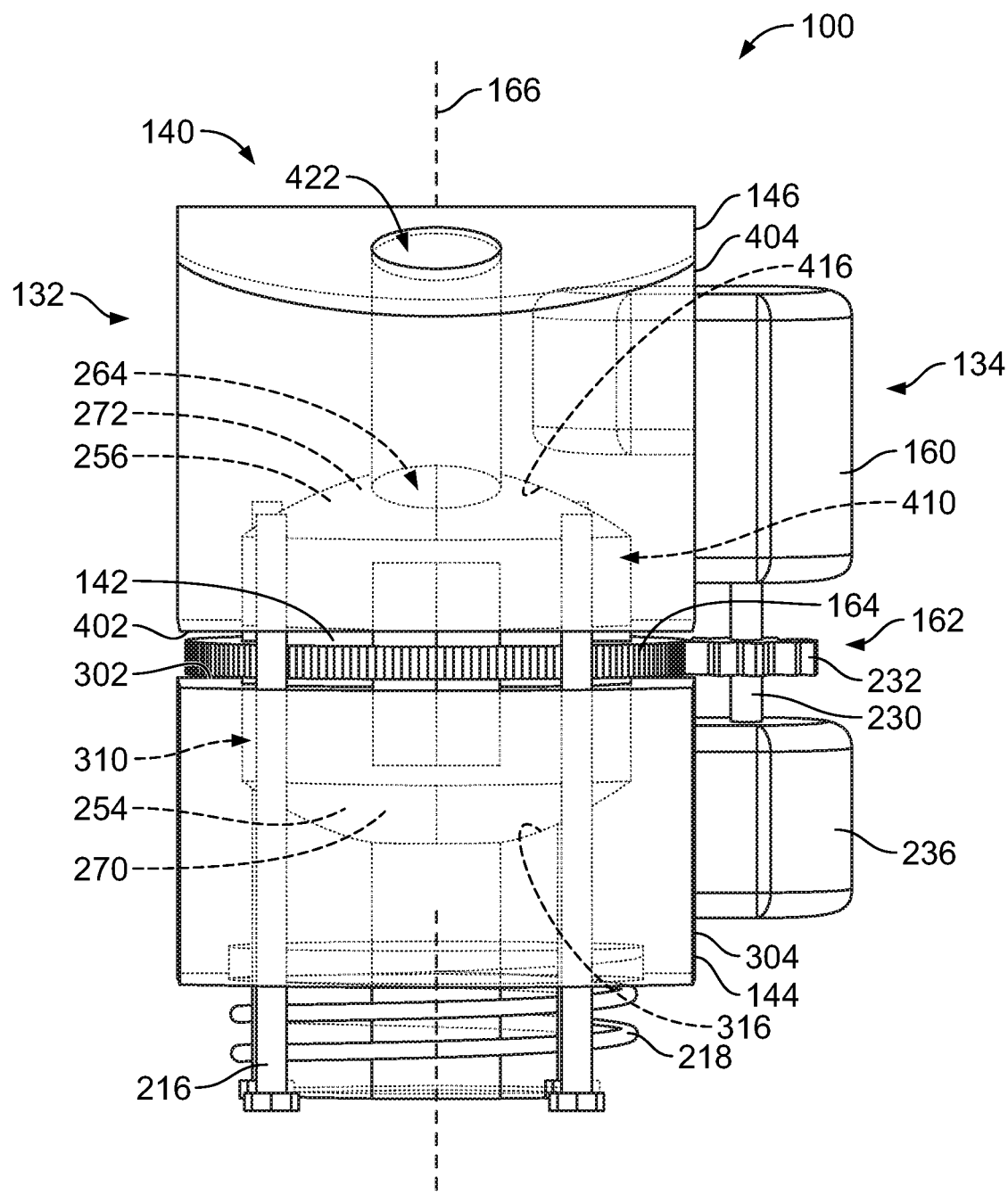
FIG. 10 is a side view of a portion of the directional flow control device in accordance with an example showing the flow assembly and the driver assembly.
Figure 11:
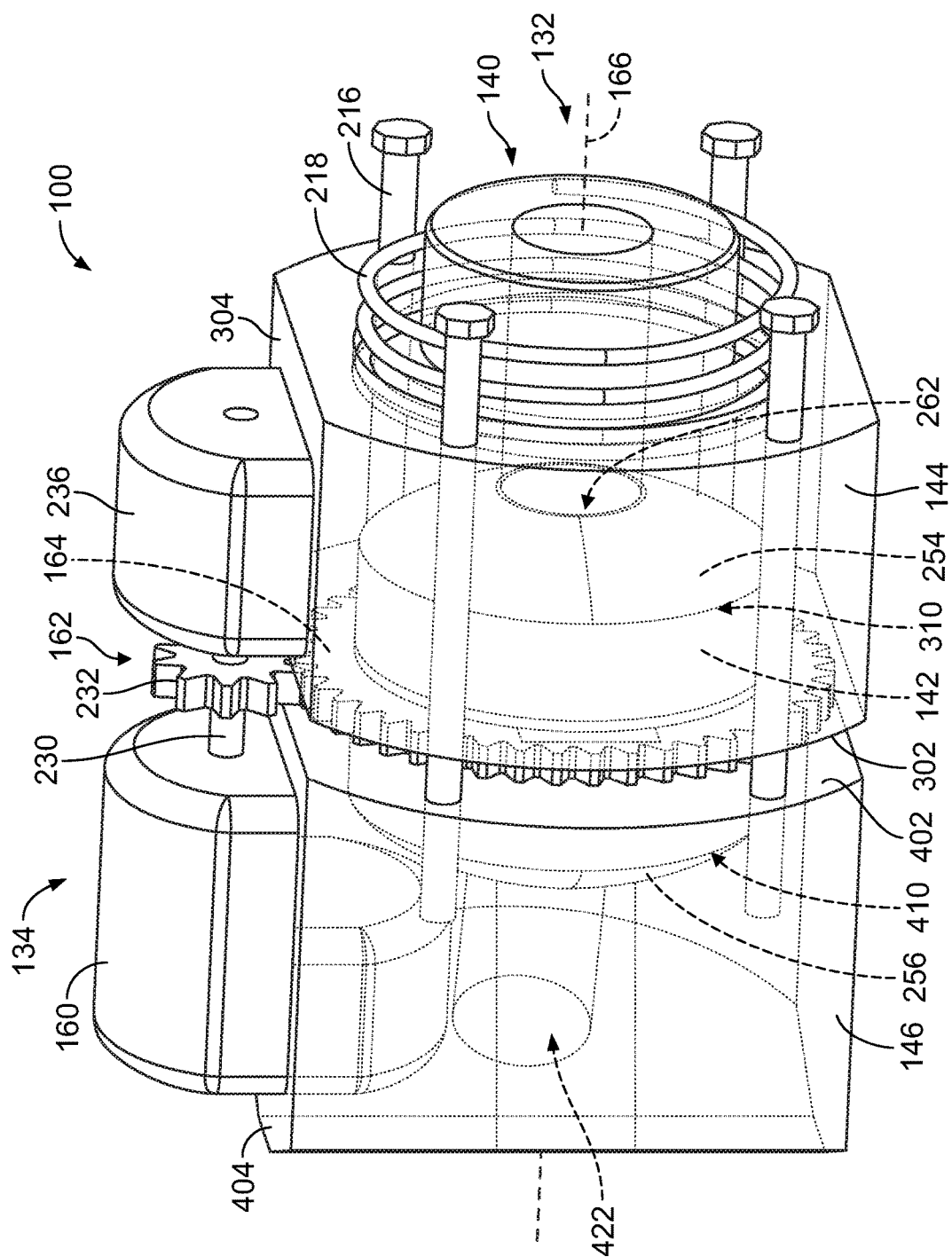
FIG. 11 is a front perspective view of a portion of the directional flow control device in accordance with an example showing the flow assembly and the driver assembly.

FIG. 9 is a rear perspective view of a portion of the directional flow control device 100 in accordance with an example showing the flow assembly 132 and the driver assembly 134. FIG. 10 is a side view of a portion of the directional flow control device 100 in accordance with an example showing the flow assembly 132 and the driver assembly 134. FIG. 11 is a front perspective view of a portion of the directional flow control device 100 in accordance with an example showing the flow assembly 132 and the driver assembly 134. The shell 130 (shown in FIG. 2) is removed for clarity to illustrate the flow assembly 132 and the driver assembly 134.

When assembled, the flow deflector 142 (shown in phantom) is received in the gear 164. The flow deflector 142 and the gear 164 are received in the housing 140. For example, the front end 254 of the flow deflector 142 is received in the front pocket 310 of the front housing 144 and the rear end 256 of the flow deflector 142 is received in the rear pocket 410 of the rear housing 146. The gear 164 is positioned between the inner ends 302, 402 of the front housing 144 and the rear housing 146. The fasteners 216 are used to secure the housing 140 to the shell 130. For example, the fasteners 216 pass through the front housing 144 and are coupled to the rear housing 146. In an example, the front housing 144 is slidable along the fasteners 216 relative to the rear housing 146 and the shell 130. For example, the biasing spring 218 is used to bias the front housing 144 rearward toward the rear housing 146. The biasing spring 218 presses the front housing 144 against the flow deflector 142 and presses the flow deflector 142 against the rear housing 146. For example, the biasing spring 218 presses the front sealing surface 316 against the front sealing surface 270 of the flow deflector 142 to press the front end 254 in sealing engagement with the front sealing surface 316. The pressure from the biasing spring 218 and the front housing 144 on the flow deflector 142 presses the flow deflector 142 rearward against the rear housing 146. The rear sealing surface 272 of the flow deflector 142 is biased against the rear sealing surface 416 of the rear housing 146 by the biasing spring 218 pressing against the front housing 144 to press the rear end 256 in sealing engagement with the rear sealing surface 416. The spring constant of the biasing spring 218 is sufficient to overcome the fluid pressure plus a factor of safety, such as when the valve is at a shut-off position, to avoid a possible leak in the directional flow control device 100.

In an example, the driver assembly 134 is mounted to the flow assembly 132. The bearing 236 is mounted to the top 304 of the front housing 144. The motor 160 is mounted to the top 404 of the rear housing 146. The driveshaft 230 extends between the bearing 236 and the motor 160. The pinion gear 232 is mounted on the driveshaft 230 and is operably coupled to the gear 164. Rotation of the actuator 162 by the motor 160 causes rotation of the flow deflector 142 about the rotation axis 166.

The intake bore 262 is axially aligned with the inlet bore 320 of the front housing 144 along the rotation axis 166. Rotation of the flow deflector 142 does not change the relative position of the intake bore 262 with respect to the inlet bore 320. The discharge bore 264 is angled relative to the intake bore 262 and is offset from the rotation axis 166. In an example, the flow deflector 142 is rotatable relative to the front housing 144 and the rear housing 146 between a first discharge position and a second discharge position. The flow deflector 142 is rotatable to selectively couple the discharge bore 264 in flow communication with the first outlet bore 420 of the rear housing 146 and to selectively couple the discharge bore 264 in flow communication with the second outlet bore 422 of the rear housing 146 based on the position of the flow deflector 142 relative to the rear housing 146. In the first discharge position, the discharge bore 264 is aligned with and in flow communication with the first outlet bore 420 of the rear housing 146. In the second discharge position, the discharge bore 264 is aligned with and in flow communication with the second outlet bore 422 of the rear housing 146. In an example, the first and second outlet bores 420, 422 are angled relative to each other, such as at an angle of less than 45°. In an example, the flow deflector 142 is rotated 180° between the first discharge position and the second discharge position. The flow deflector 142 may be rotated other angles of rotation in alternative examples. Optionally, the flow deflector 142 may be rotated to a shut-off position in which the discharge bore 264 is in flow communication with neither the first outlet bore 420 nor the second outlet bore 422 to stop flow through the directional flow control device 100. For example, the flow deflector 142 may be rotated 90° from the first discharge position and/or from the second discharge position to the shut-off position.

Position of the flow deflector 142 may be controlled by the motor 160 and/or by a position control device (not shown). For example, the motor 160 may have built-in position control. For example, the motor 160 may be calibrated to control the position of the flow deflector 142 based on a position of the motor 160 and/or the driveshaft 230 and/or the pinion gear 232. In other examples, a separate position control device, such as a laser target device may provide real-time feedback to the motor 160 to control the position of the flow deflector 142. The laser target device may target the gear 164 and/or the flow deflector 142 and/or the pinion gear 232 and/or the driveshaft 230.

FIG. 12 is a perspective view of a portion of the directional flow control device 100 showing the flow deflector 142 in a first discharge position. FIG. 13 is a perspective view of a portion of the directional flow control device 100 showing the flow deflector 142 in a second discharge position. FIG. 14 is a perspective view of a portion of the directional flow control device 100 showing the flow deflector 142 in a shut-off position.

In the first discharge position (FIG. 12), the intake bore 262 is aligned with and in flow communication with the inlet bore 320 of the front housing 144. The discharge bore 264 is aligned with and in flow communication with the first outlet bore 420 of the rear housing 146. Fluid is able to flow through the fluid system 102 from the supply line 104, through the inlet bore 320, through the intake bore 262, through the discharge bore 264, through the first outlet bore 420 into the first discharge line 106.

In the second discharge position (FIG. 13), the intake bore 262 is aligned with and in flow communication with the inlet bore 320 of the front housing 144. The discharge bore 264 is aligned with and in flow communication with the second outlet bore 422 of the rear housing 146. Fluid is able to flow through the fluid system 102 from the supply line 104, through the inlet bore 320, through the intake bore 262, through the discharge bore 264, through the second outlet bore 422 into the second discharge line 108.

In the shut-off position (FIG. 14), the intake bore 262 is aligned with and in flow communication with the inlet bore 320 of the front housing 144. The discharge bore 264 is offset from the first outlet bore 420 and from the second outlet bore 422 of the rear housing 146. The flow deflector 142 is rotated to the shut-off position to stop flow through the directional flow control device 100.

Figure 15:
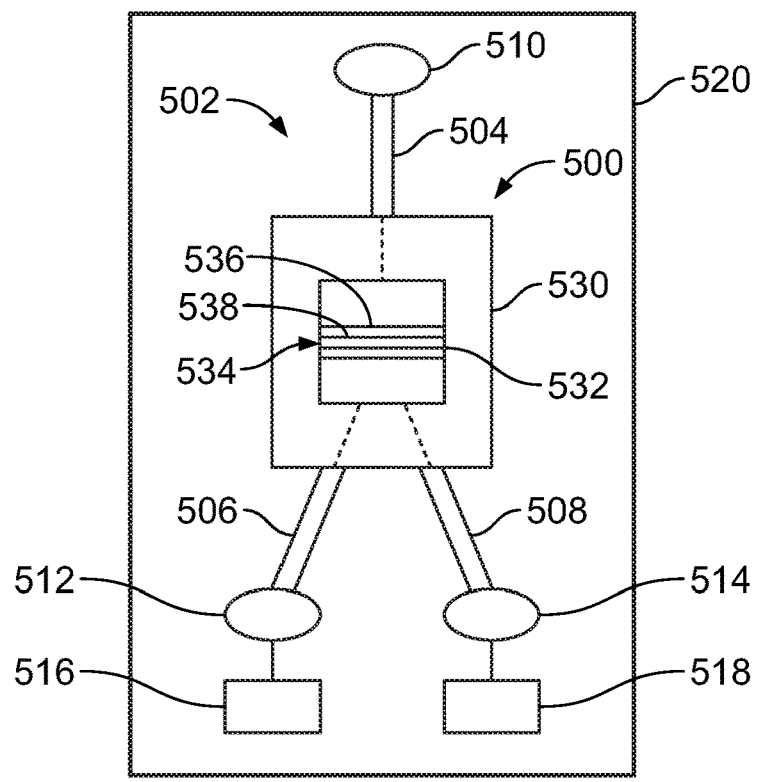
FIG. 15 is a schematic view of a directional flow control device in accordance with an example for use in a fluid system.

FIG. 15 is a schematic view of a directional flow control device 500 in accordance with an example for use in a fluid system 502. The directional flow control device 500 is similar to the directional flow control device 100 (shown in FIG. 1); however, the directional flow control device 500 is actuated by an electro-magnetic actuation device rather than an electric motor. The directional flow control device 500 is actuated without the use of a drive shaft or gears. The directional flow control device 500 controls fluid flow in the fluid system 502.

The fluid system 502 includes at least one supply line and at least one discharge line coupled to the directional flow control device 500. For example, in the illustrated example, the fluid system 502 includes a first supply line 504, a first discharge line 506 and a second discharge line 508. In an example, the first supply line 504 is coupled to a first supply reservoir 510, the first discharge line 506 is coupled to a first discharge reservoir 512 and the second discharge line 508 is coupled to a second discharge reservoir 514. The directional flow control device 500 is used to control flow between the first supply reservoir 510 and the first and second discharge reservoirs 512, 514. For example, the directional flow control device 500 may control fluid flow therethrough from the first supply line 504 to the first discharge line 506 or the second discharge line 508. In various examples, the fluid system 502 may include more than one supply line 504 and/or more than one supply reservoir 510. Optionally, the directional flow control device 500 may be operable in a shut-off state where the directional flow control device 500 restricts fluid flow to the first discharge line 506 and the second discharge line 508. In alternative examples, the flow through the directional flow control device may be reversed such that the reservoirs 512, 514 are supply reservoirs and the reservoir 510 is a discharge reservoir; however, the description of the directional flow control device herein is with reference to the supply and discharge arrangement illustrated in FIG. 15.

The first discharge reservoir 512 may be coupled to a first working component 516 and the second discharge reservoir 514 may be coupled to a second working component 518. The fluid is used by the first and second working components 516, 518 for one or more functions or operations. For example, in an example, the fluid system 502 may be used in a vehicle, such as an aircraft 520. By way of example, the fluid system 502 may be a fuel supply system and the directional flow control device 500 may be used to control supply of fuel from the first supply reservoir 510 to the various first and second discharge reservoirs 512, 514. The first and second working components 516, 518 may be fuel pumps in such examples. By way of example, the fluid system 502 may be a flight control system, such as for controlling a position of a rudder or a flap, and the directional flow control device 500 may be used to control supply of hydraulic fluid within the fluid system 502, such as for moving the rudder or the flap. The first and second working components 516, 518 may be hydraulic actuators in such examples. By way of example, the fluid system 502 may be a landing gear control system, such as for controlling a position of the landing gear of the aircraft 520, and the directional flow control device 500 may be used to control supply of hydraulic fluid within the landing gear control system to raise or lower the landing gear of the aircraft 520. The fluid system 502 may be used in other subsystems of the aircraft 520 in alternative examples. The fluid system 502 may be used in other types of vehicles other than aircraft in alternative examples. The fluid system 502 may be used in non-vehicle applications, such as industrial applications, in alternative examples.

In an example, the directional flow control device 500 includes a shell 530, a flow assembly 532 received in the shell 530 and a driver assembly 534 received in the shell 530. The flow assembly 532 and/or the driver assembly 534 are contained within and enclosed by the shell 530 in various examples. The flow assembly 532 is fluidly coupled to the supply line 504 and the first and second discharge lines 506, 508. The driver assembly 534 is an electro-magnetic driver assembly including a stator 536 and a rotor 538 rotated by the stator 536. The driver assembly 534 is operably coupled to the flow assembly 532 to control operation of the flow assembly 532, such as by moving the flow assembly 532 to different discharge positions to control flow to the first discharge line 506 or the second discharge line 508. Option-ally, the driver assembly 534 may be operated to move the flow assembly 532 to a shut-off position to stop flow through the fluid system 502.

Figure 16:
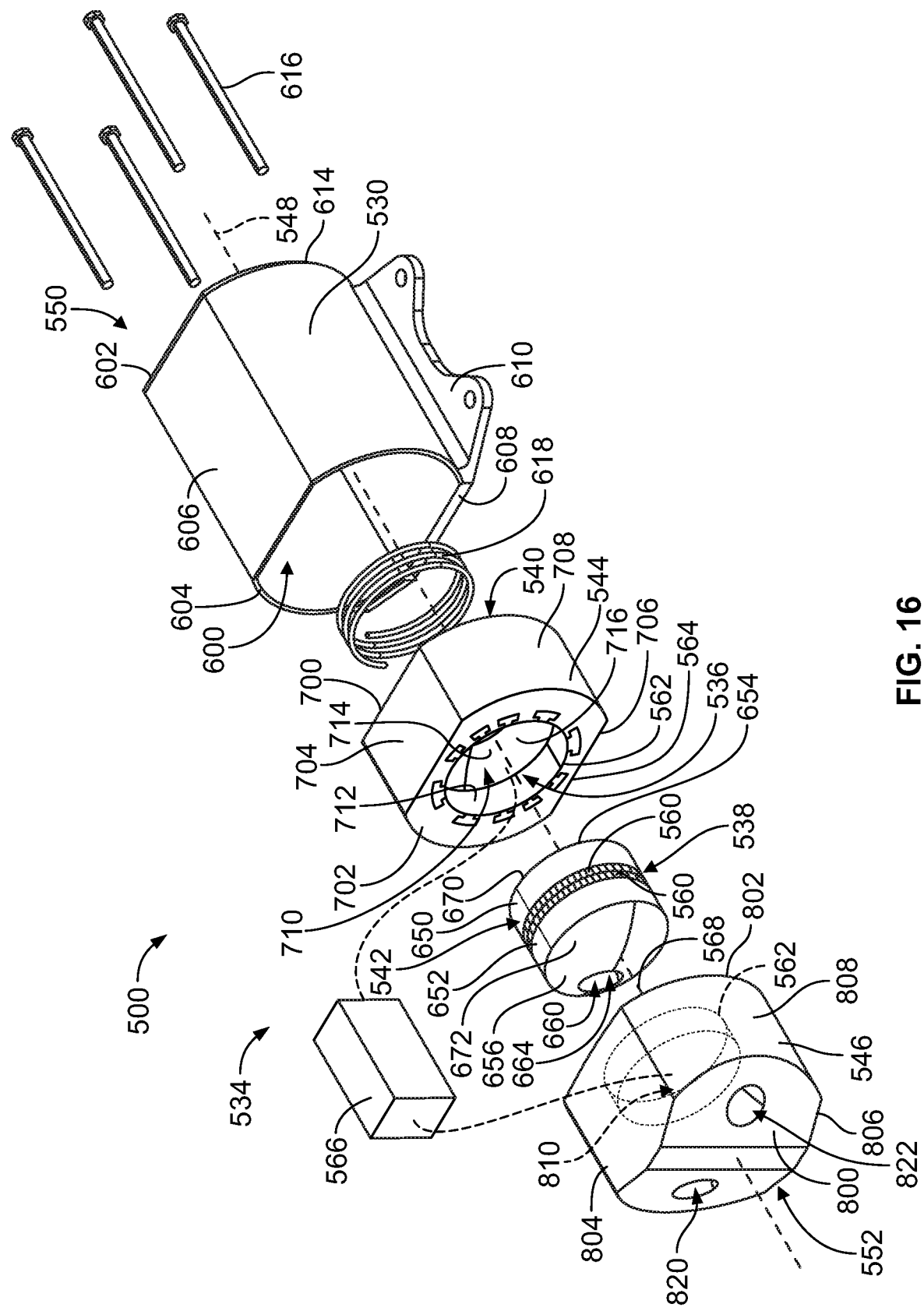
FIG. 16 is an exploded view of the directional flow control device in accordance with an example.

FIG. 16 is an exploded view of the directional flow control device 500 in accordance with an example. The directional flow control device 500 includes the shell 530, the flow assembly 532 and the driver assembly 534. In an example, the flow assembly 532 includes a housing 540 and a flow deflector 542 received in the housing 540. In the illustrated example, the housing 540 is a multi-piece housing including a front housing 544 and a rear housing 546. The flow deflector 542 is configured to be captured between the front housing 544 and the rear housing 546. The flow deflector 542, the front housing 544 and the rear housing 546 are configured to be received in the shell 530 along a longitudinal axis 548. In an example, the flow deflector 542 is rotatably received within the front housing 544 and the rear housing 546 to control flow through the directional flow control device 500. The housing 540 extends between an inlet end 550 and a discharge end 552 opposite to the inlet end 550. The inlet end 550 and the discharge end 552 are arranged along the longitudinal axis 548.

In an example, the driver assembly 534 includes the stator 536 and the rotor 538. The rotor 538 includes rotor magnets 560. In an example, the rotor magnets 560 are coupled to the flow deflector 542. For example, the flow deflector 542 defines the rotating element (rotor) of the driver assembly 534. The rotor magnets 560 are arranged along the outer perimeter of the flow deflector 542. The rotor magnets 560 extend circumferentially around the flow deflector 542. In various examples, the rotor magnets 560 may be embedded in the flow deflector 542, such as being flush with the outer perimeter of the flow deflector 542. In other various examples, the rotor magnets 560 may extend from the flow deflector 542, such as forming teeth arranged around the outer perimeter of the flow deflector 542.

The stator 536 includes stator magnets 562 associated with the housing 540. In an example, the stator magnets 562 are coupled to and/or held by the housing 540. In various examples, the stator magnets 562 are provided on the housing 540. In various examples, the stator magnets 562 are provided in the housing 540. In various examples, the stator magnets 562 are coupled to the front housing 544, such as along an interior surface of the front housing 544 facing the flow deflector 542. In other various examples, the stator magnets 562 are coupled to the rear housing 546, such as along an interior surface of the rear housing 546 facing the flow deflector 542. In other various examples, the stator magnets 562 are coupled to both the front housing 544 and the rear housing 546. In alternative examples, the stator magnets 562 may be positioned between the front housing 544 and the rear housing 546 rather than being received in the front housing 544 and/or the rear housing 546. The stator magnets 562 extend circumferentially around the housing 540. In various examples, the stator magnets 562 may be embedded in the housing 540, such as being flush with the surface(s) of the housing 540. In other various examples, the stator magnets 562 may extend from the housing 540, such as forming teeth arranged around the housing 540. The stator magnets 562 may be positioned inside the front housing 544 and/or the rear housing 546, such as in pockets in the front and rear housing 544, 546. In other examples, the stator magnets may be located between the front housing 544 and the rear housing 546. The stator 536 drives the rotor 538. The stator magnets 562 are energized to move the rotor 538. For example, the stator 536 includes coil windings 564 to energize the stator magnets 562. The coil windings 564 are coupled to a control module 566, used to control operation of the stator 536 to rotate the rotor 538 about a rotation axis 568, which may be coincident with and/or parallel to the longitudinal axis 548. The control module 566 includes control circuitry used to supply power to the coil windings 564.

The shell 530 includes body defining a cavity 600 extending between a front 602 and a rear 604 of the shell 530. The cavity 600 receives the flow assembly 532. The body may be manufactured from a metal material or a durable plastic material to protect the other components of the directional flow control device 500. The body may be thin to reduce weight of the directional flow control device 500. The shell 530 includes a top 606 and a bottom 608 opposite the top 606. In various examples, the shell 530 may be flat at the bottom 608 and/or the top 606. In an example, the shell 530 includes a mounting flange 610 at the bottom 608 for mounting the directional flow control device 500 to another component or structure, such as within the aircraft 520. The mounting flange 610 may be provided at other locations in alternative examples.

In an example, the cavity 600 is open at the rear 604 to receive the components of the directional flow control device 500. Optionally, a cover (not shown) may be coupled to the shell 530 at the rear 604 to close the cavity 600, such as to hold the flow assembly 532 in the cavity 600. In an example, the shell 530 includes an end wall 614 (shown in FIG. 19 at the front 602. In various examples, the flow assembly 532 is coupled to the end wall 614. For example, in the illustrated example, the directional flow control device 500 includes fasteners 616 used to secure the flow assembly 532 to the shell 530. In an example, the fasteners 616 are configured to pass through the front housing 544 and are configured to be threadably coupled to the rear housing 546. For example, the rear housing 546 is fixed to the end wall 614 of the shell 530 by the fasteners 616. The front housing 544 may be axially movable along the fasteners 616 relative to the rear housing 546 and the shell 530. For example, in an example, the directional flow control device 500 includes a biasing spring 618 configured to engage the front housing 544 and the end wall 614 of the shell 530 to bias the front housing 544 toward the rear housing 546. The flow deflector 542 is captured between the front housing 544 and the rear housing 546. The biasing spring 618 sealingly compresses the front housing 544 against the flow deflector 542.

The flow deflector 542 includes a cylindrical hub 650 having a cylindrical outer perimeter 652. The flow deflector 542 extends between a front end 654 and a rear end 656. In an example, hub 650 defines the rotor 538 and is rotatable around the rotation axis 568. The rotor magnets 560 are coupled to the hub 650, such as around the outer perimeter 652 of the hub 650. The rotor magnets 560 may be approximately centered along the hub 650 between the front end 654 and the rear end 656. In various examples, the rotor magnets 560 are arranged in multiple arrays around the hub 650, such as a first array extending circumferentially around the outer perimeter of the hub 650 of the flow deflector 542 and a second array extending circumferentially around an outer perimeter of the hub 650 of the flow deflector 542. The first array is positioned forward of the second array.

The flow deflector 542 includes a flow channel 660 extending therethrough. The flow channel 660 includes an intake bore 662 (shown in FIG. 22) and a discharge bore 664. The intake bore 662 is open at the front end 654 and the discharge bore 664 is open at the rear end 656. In an example, the intake bore 662 is coaxial with the rotation axis 568 and the discharge bore 664 is offset from the rotation axis 568. For example, the discharge bore 664 is angled nonparallel to the intake bore 662.

In an example, the front end 654 has a convex, curved profile defining a front sealing surface 670 configured to seal against the front housing 544. The rear end 656 has a convex, curved profile defining a rear sealing surface 672 configured to seal against the rear housing 546. In other various examples, the front end 654 and/or the rear end 656 may be flat rather than being curved or may have other shapes in alternative examples.

The front housing 544 extends along the longitudinal axis 548 between a front end 700 and an inner end 702. The inner end 702 is configured to face the rear housing 546. The front housing 544 includes a top 704 and a bottom 706 extending between the front end 700 and the inner end 702. In various examples, the top 704 and/or the bottom 706 may be flat for engagement with and support by the shell 530. For example, the flat surfaces may resist rotation of the rear housing 546 relative to the shell 530. The front housing 544 includes sides 708 extending between the top 704 and the bottom 706. In various examples, the sides 708 are curved; however, the sides 708 may have other shapes in alternative examples. The top 704 and/or the bottom 706 may be curved. In an example, the stator magnets 562 are coupled to the front housing 544.

The front housing 544 includes a front pocket 710 configured to receive the flow deflector 542. The front pocket 710 is sized and shaped to receive the front end 654 of the flow deflector 542. In an example, the front pocket 710 is defined by one or more sidewalls 712 and an end wall 714. The end wall 714 defines a front sealing surface 716 of the front pocket 710. The end wall 714 has a complementary shape to the front end 654 of the flow deflector 542. For example, the end wall 714 may have a concave, curved profile defining the front sealing surface 716. In an example, the sidewall 712 is circular and allows rotation of the flow deflector 542 in the front pocket 710. The sidewall 712 supports a portion of the hub 650. In an example, the stator magnets 562 may be arranged within the front pocket 710. For example, the stator magnets 562 may be arranged circumferentially around the front pocket 710 on the sidewall 712. The stator magnets 562 may be flush with the sidewall 712. In other various examples, the stator magnets 562 may extend inward from the sidewall 712. In other various examples, the stator magnets 562 may be coupled to the inner end 702, such as immediately rearward of the inner end 702.

The front housing 544 includes an inlet bore 720 between the end wall 714 and the front end 700. The inlet bore 720 is configured to be in flow communication with the supply line 504 (shown in FIG. 15). In an example, the inlet bore 720 is coaxial with the longitudinal axis 548. The inlet bore 720 is configured to be in flow communication with the intake bore 662 of the flow deflector 542. For example, the inlet bore 720 and the intake bore 662 are aligned along the rotation axis 568. Optionally, the inlet bore 720 may be threaded to receive the supply line 504 or a coupling on the supply line 504. Alternatively, the supply line 504 may be soldered to the inlet bore 720.

The rear housing 546 extends along the longitudinal axis 548 between a rear end 800 and an inner end 802. The inner end 802 is configured to face the front housing 544. The rear housing 546 includes a top 804 and a bottom 806 extending between the rear end 800 and the inner end 802. In various examples, the top 804 and/or the bottom 806 may be flat for engagement with and support by the shell 530. For example, the flat surfaces may resist rotation of the rear housing 546 relative to the shell 530. The rear housing 546 includes sides 808 extending between the top 804 and the bottom 806. In various examples, the sides 808 are curved; however, the sides 808 may have other shapes in alternative examples. The top 804 and/or the bottom 806 may be curved. In an example, the stator magnets 562 are coupled to the rear housing 546.

The rear housing 546 includes a rear pocket 810 (shown in phantom) configured to receive the flow deflector 542. The rear pocket 810 is sized and shaped to receive the rear end 656 of the flow deflector 542. In an example, the rear pocket 810 is defined by one or more side walls and an end wall. The end wall defines a rear sealing surface 816 of the rear pocket 810. The end wall has a complementary shape to the rear end 656 of the flow deflector 542. For example, the end wall may have a concave, curved profile defining the rear sealing surface 816. In an example, the sidewall is circular and allows rotation of the flow deflector 542 in the rear pocket 810. The sidewall supports a portion of the hub 650. In an example, the stator magnets 562 may be arranged within the rear pocket 810. For example, the stator magnets 562 may be arranged circumferentially around the rear pocket 810 on the sidewall. The stator magnets 562 may be flush with the sidewall. In other various examples, the stator magnets 562 may extend inward from the sidewall. In other various examples, the stator magnets 562 may be coupled to the inner end 802, such as immediately rearward of the inner end 802.

The rear housing 546 includes a first outlet bore 820 between the end wall and the rear end 800 and a second outlet bore 822 between the end wall and the rear end 800. The first and second outlet bores 820, 822 are configured to be in flow communication with the discharge lines 506, 508 (shown in FIG. 15), respectively. The first and second outlet bores 820, 822 are configured to be in flow communication with the discharge bore 664 of the flow deflector 542 depending on the orientation of the flow deflector 542 relative to the rear housing 546. In an example, the first and second outlet bores 820, 822 are angled relative to each other. The first and second outlet bores 820, 822 are angled relative to the longitudinal axis 548. Optionally, the first and second outlet bores 820, 822 may be threaded to receive the first and second discharge lines 506, 508 or couplings on the first and second discharge lines 506, 508. Alternatively, the first and second discharge lines 506, 508 may be soldered to the first and second outlet bores 820, 822. In other various examples, additional outlet bores may be provided providing more than two flow discharge paths.

Figure 17:
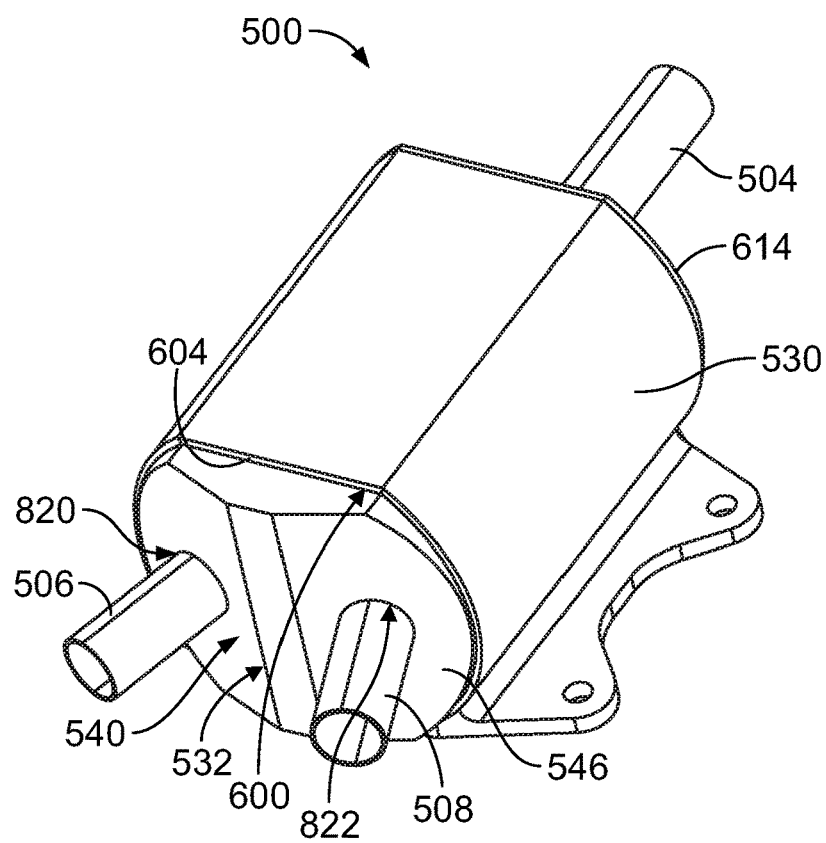
FIG. 17 is a perspective view of the directional flow control device in accordance with an example showing the supply line coupled to the directional flow control device and showing the first and second discharge lines coupled to the directional flow control device.
Figure 18:
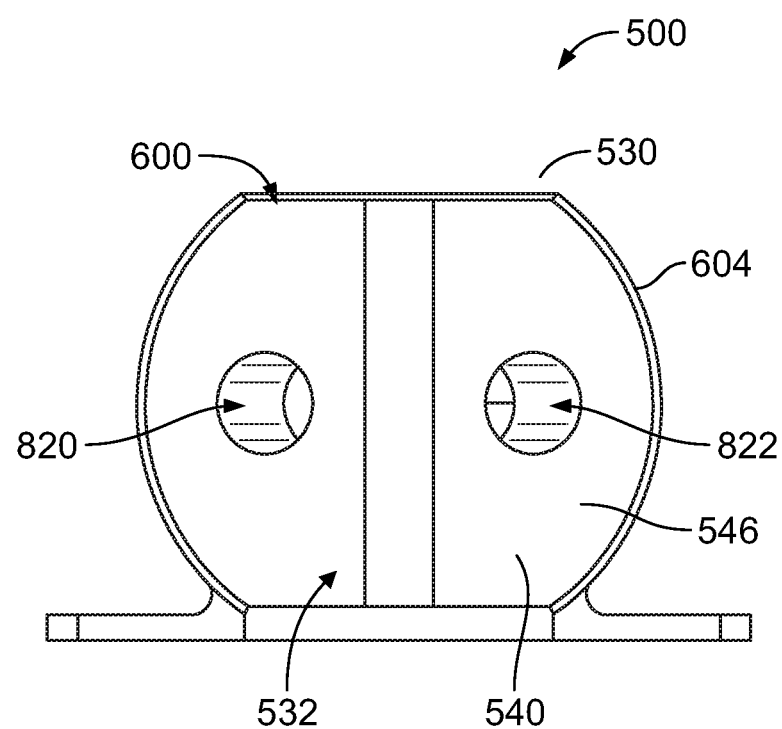
FIG. 18 is a rear view of the directional flow control device.
Figure 19:
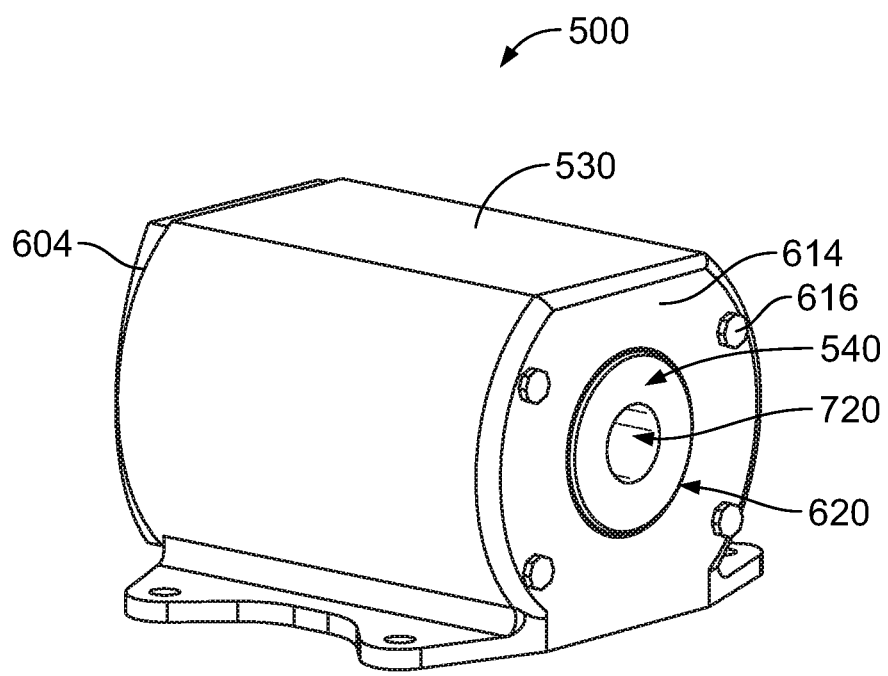
FIG. 19 is a front perspective view of the directional flow control device.

FIG. 17 is a perspective view of the directional flow control device 500 in accordance with an example showing the supply line 504 coupled to the directional flow control device 500 and showing the first and second discharge lines 506, 508 coupled to the directional flow control device 500. FIG. 18 is a rear view of the directional flow control device 500. FIG. 19 is a front perspective view of the directional flow control device 500.

During assembly, the flow assembly 532 and the driver assembly 534 (shown in FIG. 16) are loaded into the cavity 600 of the shell 530. For example, the driver assembly 534 may be loaded into the cavity 600 through the rear 604. The fasteners 616 (FIG. 19) are coupled to the housing 540 to secure the housing 540 in the shell 530. In an example, the shell 530 includes an opening 620 (FIG. 19) in the end wall 614 that provides access to the rear housing 546. The supply line 504 (FIG. 17) is coupled to the rear housing 546 at the inlet bore 720 (FIG. 19). The first and second discharge lines 506, 508 (FIG. 17) are coupled to the first and second outlet bores 820, 822 (FIG. 18). The directional flow control device 500 controls fluid flow from the supply line 504 to the first and second discharge lines 506, 508 through the flow assembly 532. The driver assembly 534 rotates the flow assembly 532 between various positions, such as a first discharge position to direct flow from the supply line 504 to the first discharge line 506; a second discharge position to direct flow from the supply line 504 to the second discharge line 508; and a shut-off position where flow is restricted from the supply line 504 to both the first and second discharge lines 506, 508.

Figure 20:
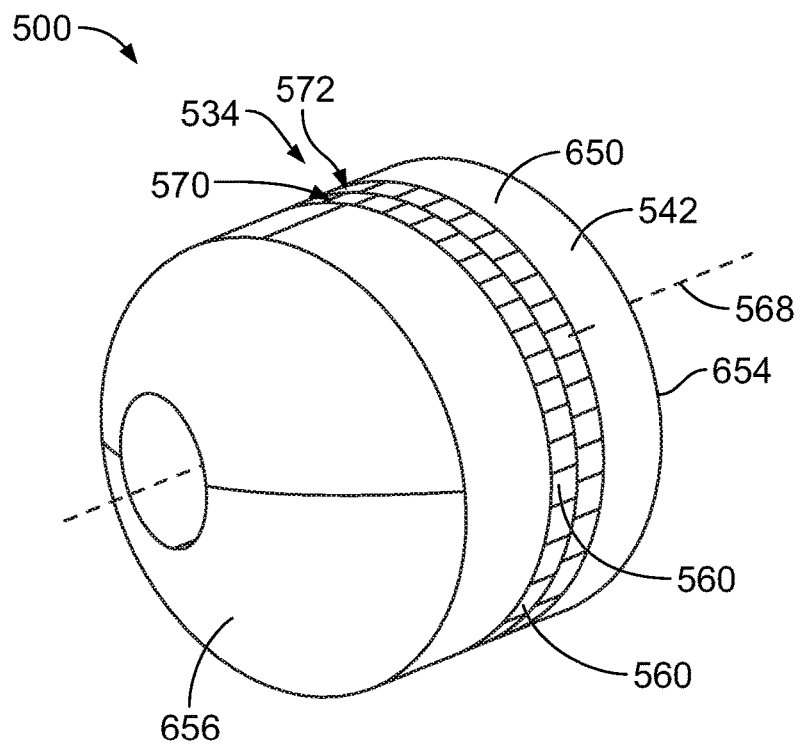
FIG. 20 is a rear perspective view of a portion of the directional flow control device showing the flow deflector and the rotor magnets in accordance with an example.
Figure 21:
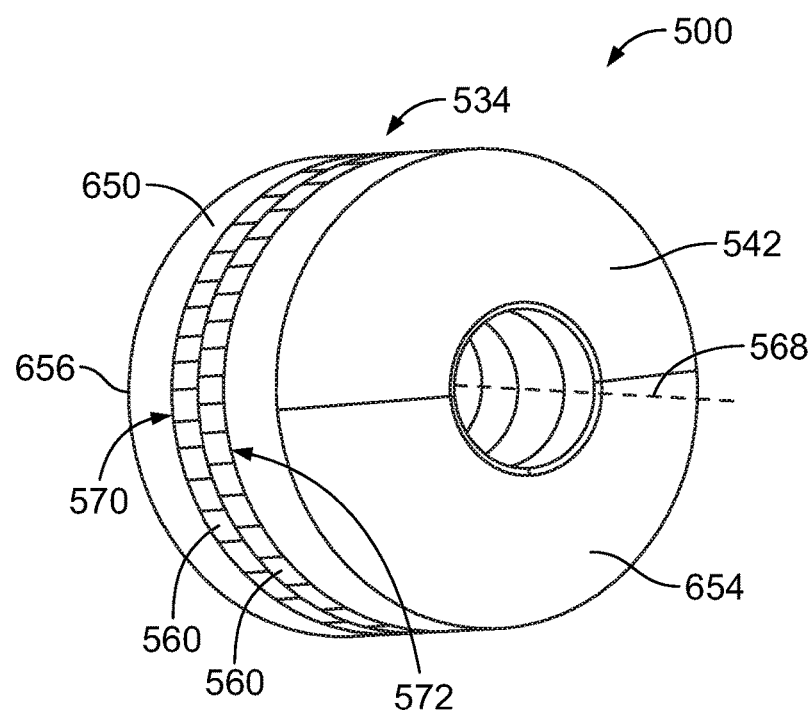
FIG. 21 is a front perspective view of a portion of the directional flow control device showing the flow deflector and the rotor magnets.

FIG. 20 is a rear perspective view of a portion of the directional flow control device 500 showing the flow deflector 542 and the rotor magnets 560 in accordance with an example. FIG. 21 is a front perspective view of a portion of the directional flow control device 500 showing the flow deflector 542 and the rotor magnets 560. In an example, the rotor magnets 560 are arranged in multiple arrays, such as a front array 570 and a rear array 572. The rotor magnets 560 are coaxial with the hub 650 along the rotation axis 568 and arranged circumferentially around the outer perimeter of the hub 650. The rotor magnets 560 may be approximately centered between the front end 654 and the rear end 656. The rotor magnets 560 may be flush with the outer perimeter of the hub 650. In other various examples, the rotor magnets 560 may extend from the hub 650, such as being formed as teeth arranged circumferentially around the hub 650. The hub 650, with the rotor magnets 560, forms a rotor that is rotated by the driver assembly 534 (shown in FIG. 16).

Figure 22:
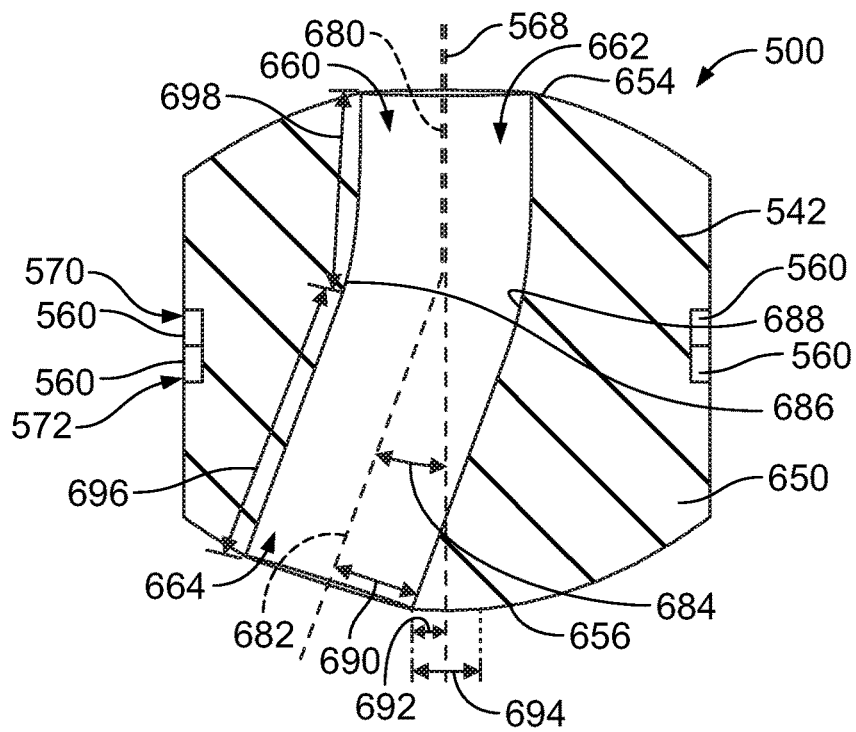
FIG. 22 is a cross-sectional view of the flow deflector in accordance with an example.

FIG. 22 is a cross-sectional view of the flow deflector 542 in accordance with an example. The rotor magnets 560 are provided at the outer perimeter of the hub 650. In the illustrated example, the rotor magnets 560 are arranged in the front array 570 and the rear array 572. The rotor magnets 560 may be flush with the outer perimeter of the hub 650. Alternatively, the rotor magnets 560 may extend outward from the hub 650.

The flow channel 660 is shown extending through the flow deflector 542 in a direction generally parallel to fluid flow through the directional flow control device 500, such as between the front end 654 and the rear end 656. The intake bore 662 extends along an intake bore axis 680 and the discharge bore 664 extends along a discharge bore axis 682. The intake bore axis 680 is parallel to the rotation axis 568.

The discharge bore axis 682 is angled relative to the intake bore axis 680 and a fluid path change angle 684. In an example, the fluid path change angle 684 between the discharge bore axis 682 and the intake bore axis 680 is less than 45°. In various examples, the fluid path change angle 684 between the discharge bore axis 682 and the intake bore axis 680 is between approximately 10° and approximately 30°. In the illustrated example, the fluid path change angle 684 between the discharge bore axis 682 and the intake bore axis 680 is approximately 20°. The flow channel 660 has an inner bend 686 and an outer bend 688 between the intake bore 662 and the discharge bore 664. The inner bend 686 and the outer bend 688 are curved to provide a smooth transition between the intake bore 662 and the discharge bore 664. Providing the smooth transition and the small fluid path change angle 684 (for example, less than) 45° allows for efficient fluid flow through the flow deflector 542. For example, the smooth transition reduces the risk of cavitation at the inner bend 686 and/or the outer bend 688. Having a relatively long inner bend 686 and/or outer bend 688, rather than an abrupt corner, allows for efficient fluid flow through the flow deflector 542. The small fluid path change angle 684 has a low efficiency knock down factor for the fluid flow through the fluid system 502. The efficiency knock down factor is a knock down factor of the efficiency of the fluid path and is a function of the bend angle of the fluid path. In various examples, the fluid path change angle 684 may have an efficiency knock down factor of less than 0.5, such as between 0.1 and 0.5. In the illustrated example, the fluid path change angle 684 has an efficiency knock down factor of less than 0.3, such as between 0.2 and 0.3. In various examples, the fluid path change angle 684 may have an efficiency knock down factor of less than half the efficiency knock down factor of a 45° deflection angle.

In an example, the discharge bore 664 has a radius 690. The discharge bore 664, at the rear end 656, is spaced from the rotation axis 568 by a distance 692 less than the radius 690. The distance 692 corresponds to the positioning of the first and second outlet bores 820, 822 (shown in FIG. 16). When the flow deflector 542 is rotated 180°, the discharge bore 664 may be aligned with the respective first and second outlet bores 820, 822. The distance 692 corresponds to a spacing 694 between the first and second outlet bores 820, 822. For example, the spacing 694 is twice the distance 692. The spacing 694 may be selected for manufacturability of the rear housing 546 (shown in FIG. 16). Having the spacing 694 narrow corresponds to a narrow distance 692. The distance 692 corresponds to the fluid path change angle 684. For example, having a narrow distance 692 reduces the fluid path change angle 684, thus reducing the efficiency knock down factor of the flow channel 660, which affects the pressure loss through the directional flow control device 500. A length 696 of the discharge bore 664 and a length 698 of the intake bore 662 affects the fluid path change angle 684. For example, having longer lengths 696, 698 reduces the fluid path change angle 684, thus reducing the efficiency knock down factor of the flow channel 660, which affects the pressure loss through the directional flow control device 500. However, increasing the lengths 696, 698 may add material cost and weight, which may be undesirable in some applications.

Figure 23:
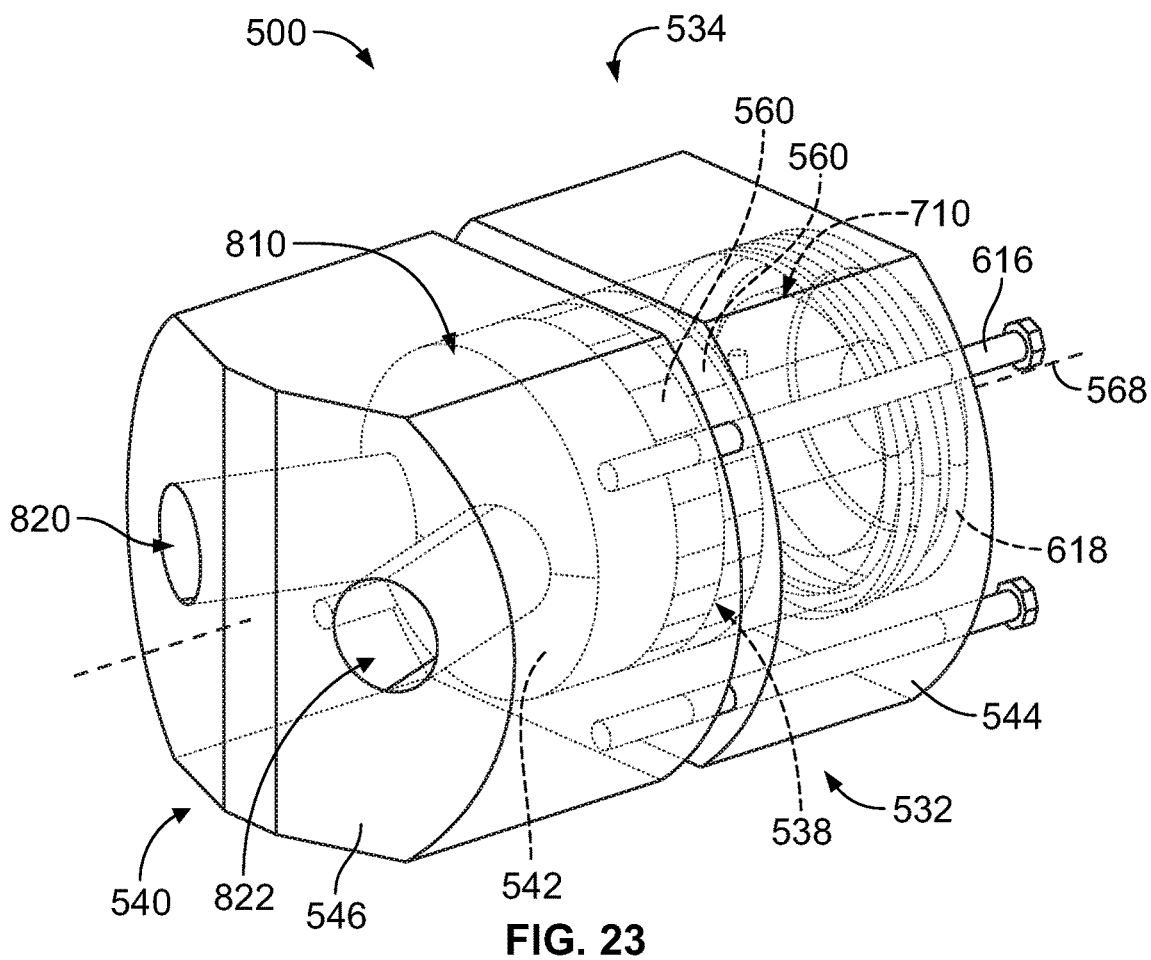
FIG. 23 is a rear perspective view of a portion of the directional flow control device in accordance with an example showing the flow assembly and the driver assembly.
Figure 24:
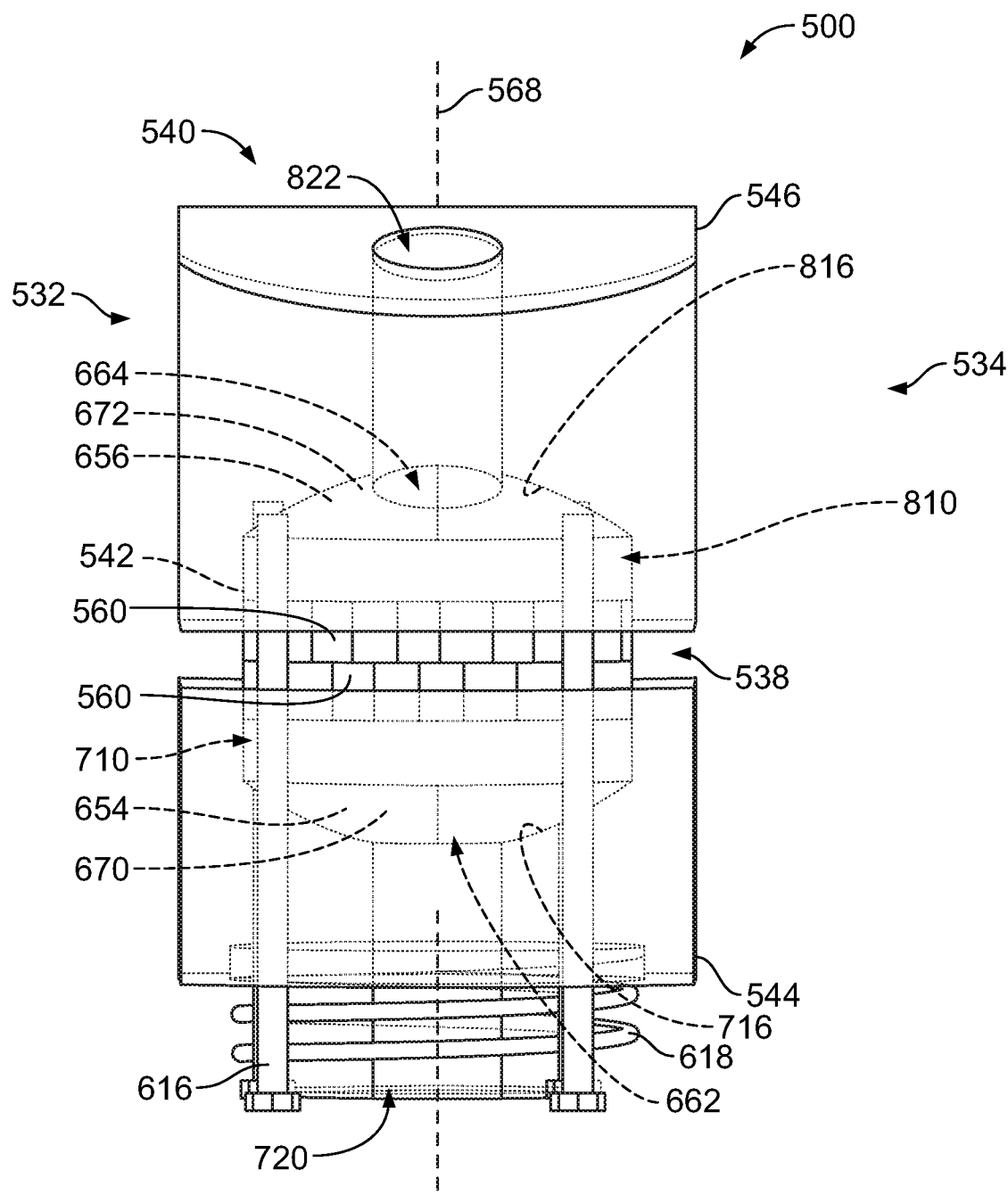
FIG. 24 is a side view of a portion of the directional flow control device in accordance with an example showing the flow assembly and the driver assembly.
Figure 25:
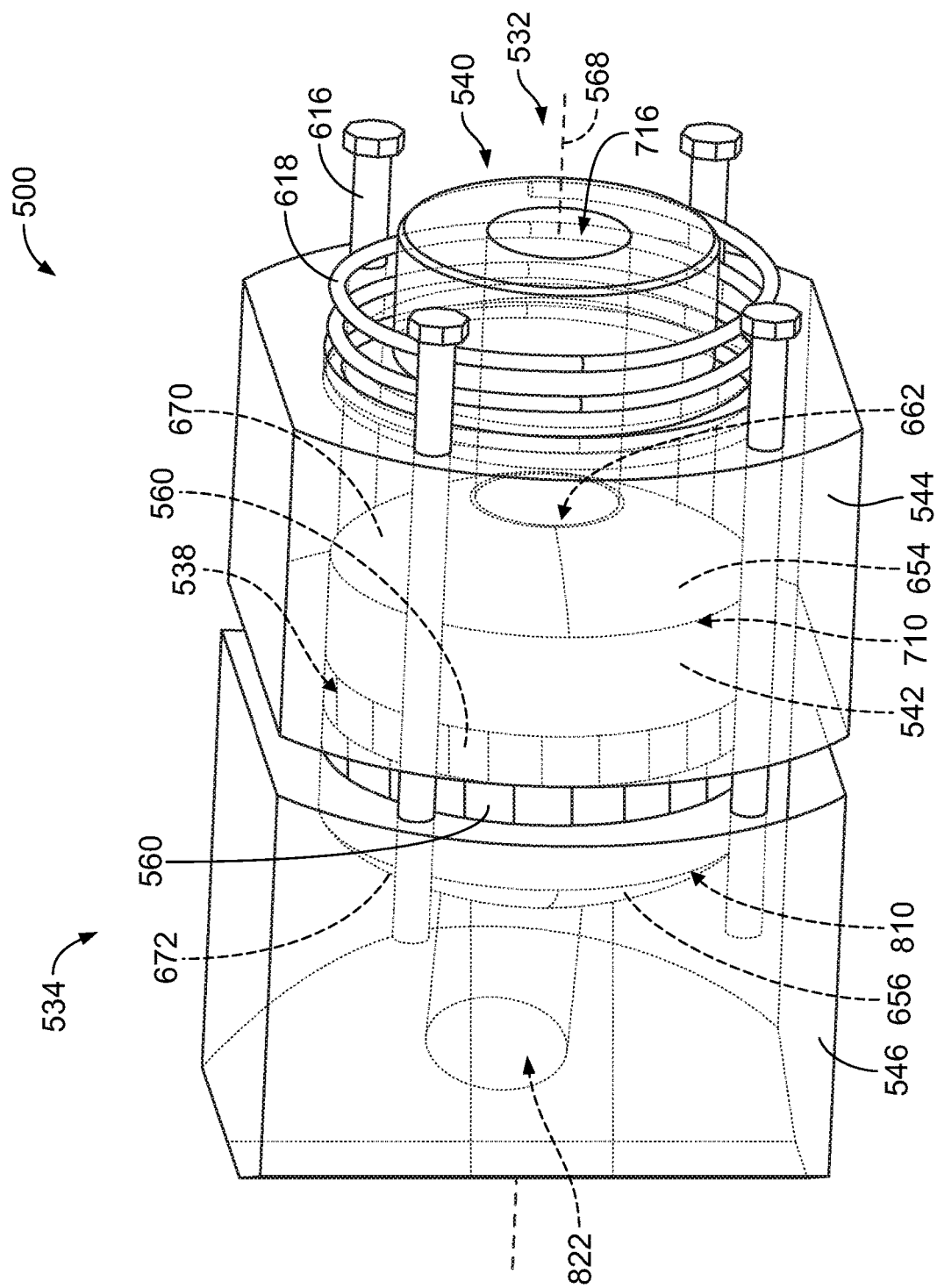
FIG. 25 is a front perspective view of a portion of the directional flow control device in accordance with an example showing the flow assembly and the driver assembly.

FIG. 23 is a rear perspective view of a portion of the directional flow control device 500 in accordance with an example showing the flow assembly 532 and the driver assembly 534. FIG. 24 is a side view of a portion of the directional flow control device 500 in accordance with an example showing the flow assembly 532 and the driver assembly 534. FIG. 25 is a front perspective view of a portion of the directional flow control device 500 in accordance with an example showing the flow assembly 532 and the driver assembly 534. The shell 530 (shown in FIG. 16) is removed for clarity to illustrate the flow assembly 532 and the driver assembly 534.

When assembled, the flow deflector 542 (shown in phantom) is received in the housing 540. For example, the front end 654 of the flow deflector 542 is received in the front pocket 710 of the front housing 544 and the rear end 656 of the flow deflector 542 is received in the rear pocket 810 of the rear housing 546. In an example, the stator magnets 562 (shown in FIG. 26) are aligned with the rotor magnets 560. The stator magnets 562 are energized to rotate the flow deflector 542 using the magnetic forces between the stator magnets 562 and the rotor magnets 560. In other examples, the stator magnets 562 may be arranged in the front pocket 710 and/or the rear pocket 810.

The fasteners 616 are used to secure the housing 540 to the shell 530. For example, the fasteners 616 pass through the front housing 544 and are coupled to the rear housing 546. In an example, the front housing 544 is slidable along the fasteners 616 relative to the rear housing 546 and the shell 530. For example, the biasing spring 618 is used to bias the front housing 544 rearward toward the rear housing 546. The biasing spring 618 presses the front housing 544 against the flow deflector 542 and presses the flow deflector 542 against the rear housing 546. For example, the biasing spring 618 presses the front sealing surface 716 against the front sealing surface 670 of the flow deflector 542 to press the front end 654 in sealing engagement with the front sealing surface 716. The pressure from the biasing spring 618 and the front housing 544 on the flow deflector 542 presses the flow deflector 542 rearward against the rear housing 546. The rear sealing surface 672 of the flow deflector 542 is biased against the rear sealing surface 816 of the rear housing 546 by the biasing spring 618 pressing against the front housing 544 to press the rear end 656 in sealing engagement with the rear sealing surface 816. The spring constant of the biasing spring 618 is sufficient to overcome the fluid pressure plus a factor of safety, such as when the valve is at a shut-off position, to avoid a possible leak in the directional flow control device 500.

The intake bore 662 is axially aligned with the inlet bore 720 of the front housing 544 along the rotation axis 568. Rotation of the flow deflector 542 does not change the relative position of the intake bore 662 with respect to the inlet bore 720. The discharge bore 664 is angled relative to the intake bore 662 and is offset from the rotation axis 568. In an example, the flow deflector 542 is rotatable relative to the front housing 544 and the rear housing 546 between a first discharge position and a second discharge position. The flow deflector 542 is rotatable to selectively couple the discharge bore 664 in flow communication with the first outlet bore 820 of the rear housing 546 and to selectively couple the discharge bore 664 in flow communication with the second outlet bore 822 of the rear housing 546 based on the position of the flow deflector 542 relative to the rear housing 546. In the first discharge position, the discharge bore 664 is aligned with and in flow communication with the first outlet bore 820 of the rear housing 546. In the second discharge position, the discharge bore 664 is aligned with and in flow communication with the second outlet bore 822 of the rear housing 546. In an example, the first and second outlet bores 820, 822 are angled relative to each other, such as at an angle of less than 45°. In an example, the flow deflector 542 is rotated 180° between the first discharge position and the second discharge position. The flow deflector 542 may be rotated other angles of rotation in alternative examples. Optionally, the flow deflector 542 may be rotated to a shut-off position in which the discharge bore 664 is in flow communication with neither the first outlet bore 820 nor the second outlet bore 822 to stop flow through the directional flow control device 500. For example, the flow deflector 542 may be rotated 90° from the first discharge position and/or from the second discharge position to the shut-off position.

Position of the flow deflector 542 may be controlled by energizing the stator magnets 562 in accordance with an electrical control scheme. The stator 536 may be a multi-phase stator, such as a two phase stator, a three phase stator, a four phase stator, or a higher phase stator. The stator 536 may be calibrated to control the position of the rotor 538 (for example, the flow deflector 542), such as to position the flow deflector 542 in the first discharge position, the second discharge position, and a shut-off position.

Figure 26:
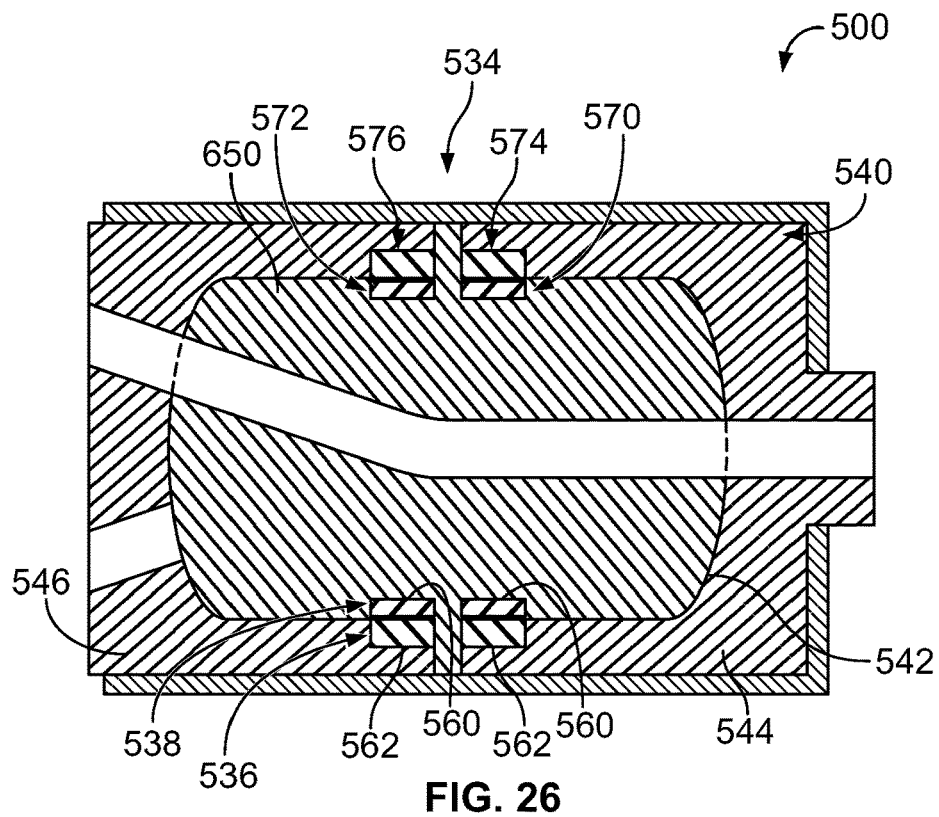
FIG. 26 is a cross-sectional view of the flow control device in accordance with an example.
Figure 27:
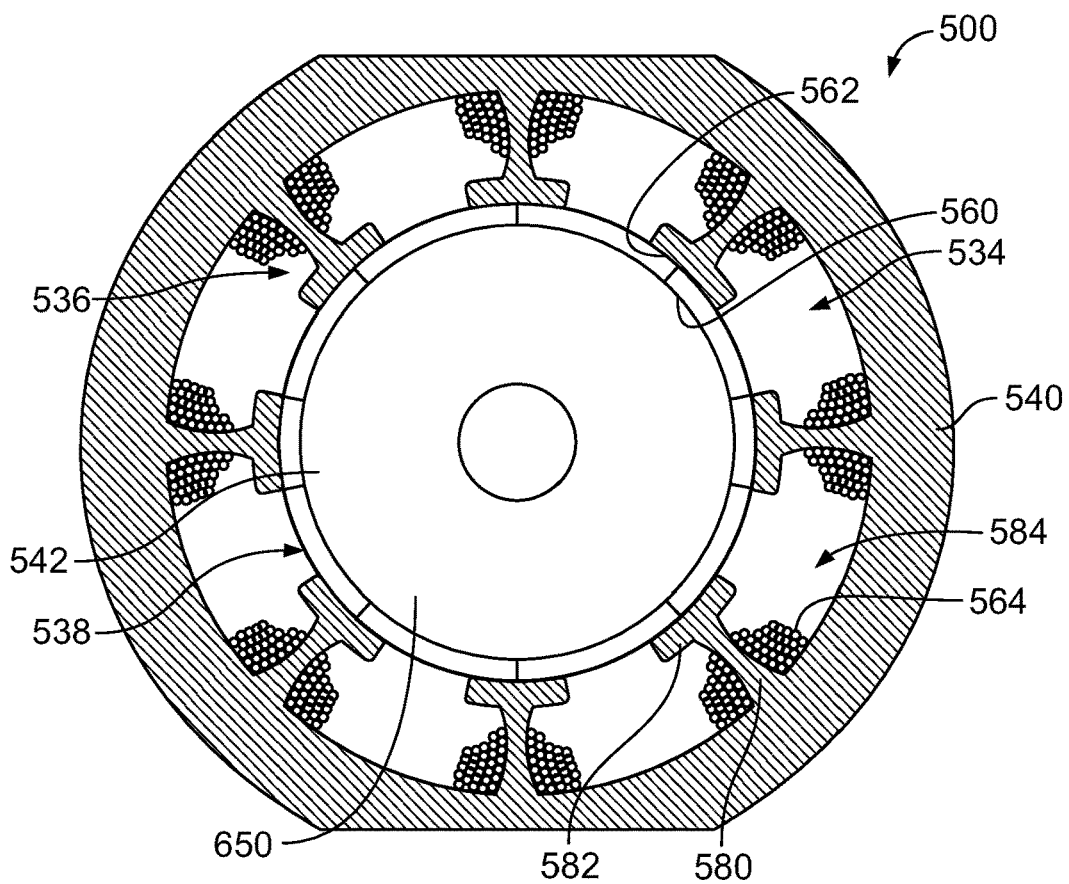
FIG. 27 is a cross-sectional view of the flow control device in accordance with an example.

FIG. 26 is a cross-sectional view of the flow control device 500 in accordance with an example. FIG. 27 is a cross-sectional view of the flow control device 500 in accordance with an example. FIGS. 26 and 27 illustrate the flow deflector 542 in the housing 540. The rotor magnets 560 and the stator magnets 562 are illustrated in FIGS. 26 and 27. The rotor magnets are coupled to the flow deflector 542. The stator magnets 562 are coupled to the front housing 544 and the rear housing 546. In an example, the stator magnets 562 are arranged in multiple arrays, such as a front array 574 and a rear array 576. The front array 574 of stator magnets 562 are coupled to the front housing 544 and aligned with the front array 570 of rotor magnets 560. The rear array 576 of stator magnets 562 are coupled to the rear housing 546 and aligned with the rear array 572 of the rotor magnets 560.

The stator 536 includes a plurality of poles 580 having pole shoes 582. The coil windings 564 are wrapped around the poles 580 in winding spaces 584 around the poles 580. The poles 580 extend from the housing 540, such as the front housing 544 and the rear housing 546. The coil windings 564 around the poles 580 to define the stator magnets 562. Other types of stator magnets 562 may be provided in alternative examples. The coil windings 564 are electrically connected to the control module 566, which supplies electrical power (for example, current) to the coil windings 564 to energize the stator magnets 562, such as in a sequential control scheme.

The rotor magnets 560 form a magnetized ring around the hub 650. The hub 650 rotates within the housing 540 without the need for a separate shaft. The electro-magnetic driver assembly 534 rotates the rotor 538 without the need for gears or a drive motor or a drive shaft or a positioner, such as in the example shown in FIG. 2. The electro-magnetic driver assembly 534 is operated without using any component that produces a spark. Thus, the flow control device 500 may be used to transfer flammable liquids, such as fuel.

FIG. 28 is a perspective view of a portion of the directional flow control device 500 showing the flow deflector 542 in a first discharge position. FIG. 29 is a perspective view of a portion of the directional flow control device 500 showing the flow deflector 542 in a second discharge position. FIG. 30 is a perspective view of a portion of the directional flow control device 500 showing the flow deflector 542 in a shut-off position. In an example, the control module 566 is operated to energize the stator magnets 562 to rotate the rotor magnets 560 and the flow deflector 542 in the housing 540 to the first discharge position. The discharge bore 664 is in flow communication with the first outlet bore 820 in the first discharge position. The control module 566 is operated to energize the stator magnets 562 to rotate the rotor magnets 560 and the flow deflector 542 in the housing 540 to the second discharge position. The discharge bore 664 is in flow communication with the second outlet bore 822 in the second discharge position. The control module 566 is operated to energize the stator magnets 562 to rotate the rotor magnets 560 and the flow deflector 542 in the housing 540 to the shut-off position. The discharge bore 664 is offset from the first and second outlet bores 820, 822 in the shut-off position. In other words, the discharge bore 664 is in flow communication with neither the first outlet bore 820 nor the second outlet bore 822 in the shut-off position.

In the first discharge position (FIG. 28), the intake bore 662 is aligned with and in flow communication with the inlet bore 720 of the front housing 544. The discharge bore 664 is aligned with and in flow communication with the first outlet bore 820 of the rear housing 546. Fluid is able to flow through the fluid system 502 from the supply line 504, through the inlet bore 720, through the intake bore 662, through the discharge bore 664, through the first outlet bore 820 into the first discharge line 506.

In the second discharge position (FIG. 29), the intake bore 662 is aligned with and in flow communication with the inlet bore 720 of the front housing 544. The discharge bore 664 is aligned with and in flow communication with the second outlet bore 822 of the rear housing 546. Fluid is able to flow through the fluid system 502 from the supply line 504, through the inlet bore 720, through the intake bore 662, through the discharge bore 664, through the second outlet bore 822 into the second discharge line 508.

In the shut-off position (FIG. 30), the intake bore 662 is aligned with and in flow communication with the inlet bore 720 of the front housing 544. The discharge bore 664 is offset from the first outlet bore 820 and from the second outlet bore 822 of the rear housing 546. The flow deflector 542 is rotated to the shut-off position to stop flow through the directional flow control device 500.

As used herein, an element or step recited in the singular and proceeded with the word "a" or "an" should be understood as not excluding plural of said elements or steps, unless such exclusion is explicitly stated. Furthermore, references to an "example" are not intended to be interpreted as excluding the existence of additional examples that also incorporate the recited features. Moreover, unless explicitly stated to the contrary, examples "comprising" or "having" an element or a plurality of elements having a particular property may include additional such elements not having that property.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from the scope thereof. Dimensions, types of materials, orientations of the various components, and the number and positions of the various components described herein are intended to define parameters of certain examples, and are by no means limiting and are merely examples. Many other examples and modifications within the spirit and scope of the claims will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A directional flow control device, comprising:
a housing, comprising an inlet end and a discharge end, the housing extending along a longitudinal axis between the inlet end and the discharge end, wherein the housing comprises:
a shell, having a cavity,
a front housing, received in the cavity of the shell and comprising a front pocket, and
a rear housing, received in the cavity of the shell and comprising a rear pocket;

stator magnets, extending circumferentially around the housing; and
a flow deflector, received in the housing and positioned relative to the stator magnets,
wherein
the flow deflector has a front end and a rear end,
the flow deflector is rotatable in the housing about a rotation axis parallel to the longitudinal axis,
the flow deflector has a flow channel therethrough,
the flow channel comprises an intake bore at the front end of the flow deflector and a discharge bore at the rear end of the flow deflector,
the intake bore is coaxial with the rotation axis,
the discharge bore is offset from the rotation axis,
the flow deflector comprises rotor magnets, aligned with and facing the stator magnets,
the front end of the flow deflector is positioned in the front pocket of the front housing,
the rear end of the flow deflector is positioned in the rear pocket of the rear housing,
the shell contains the stator magnets and the rotor magnets, and
the stator magnets are energized to cause rotation of the flow deflector relative to the housing.

2. The directional flow control device of claim 1, wherein:
the flow deflector further comprises a hub,
the hub is cylindrical, and
the rotor magnets are arranged circumferentially around an outer perimeter of the hub.

3. The directional flow control device of claim 1, wherein:
the rotor magnets are arranged in a first array, extending circumferentially around an outer perimeter of the flow deflector, and in a second array, extending circumferentially around the outer perimeter of the flow deflector, and
the first array is positioned closer to the front end of the flow deflector than the second array.

4. The directional flow control device of claim 1, wherein:
the flow deflector further comprises a hub, and
the rotor magnets are embedded in the hub of the flow deflector.

5. The directional flow control device of claim 1, wherein the rotor magnets are magnetized teeth.

6. The directional flow control device of claim 1, wherein the flow deflector is rotatable within the housing without requiring a shaft connection between the flow deflector and the housing.

7. The directional flow control device of claim 1, wherein the flow deflector is rotatable within the housing without requiring a gear drive to rotate the flow deflector.

8. The directional flow control device of claim 1, further comprising a control module, and
coil windings,
wherein the stator magnets are energized by the coil windings, electrically connected to the control module.

9. The directional flow control device of claim 1, wherein the discharge bore is rotatable relative to the housing between a first discharge position and a second discharge position.

10. The directional flow control device of claim 1, wherein:
the intake bore extends along an intake bore axis, and
the discharge bore extends along a discharge bore axis, which has a fluid path change angle from 10° to 45° relative to the intake bore axis.

11. The directional flow control device of claim 1, wherein:
the front housing also comprises an inlet bore in flow communication with the intake bore,
the rear housing also comprises a first outlet bore and a second outlet bore, and
the flow deflector is rotatable relative to the housing to selectively couple the discharge bore in flow communication with the first outlet bore and is also rotatable to selectively couple the discharge bore in flow communication with the second outlet bore.

12. The directional flow control device of claim 11, wherein:
the flow deflector is rotatable relative to the housing to a first discharge position so that the discharge bore is in flow communication with the first outlet bore,
the flow deflector is rotatable relative to the housing to a second discharge position so that the discharge bore is in flow communication with the second outlet bore, and
the flow deflector is rotatable relative to the housing to a shut-off position so that the discharge bore is in flow communication with neither the first outlet bore nor the second outlet bore so that flow through the directional flow control device is stopped.

13. The directional flow control device of claim 1, wherein the stator magnets circumferentially surround at least one of the front pocket or the rear pocket.

14. The directional flow control device of claim 1, wherein the stator magnets are positioned between the front housing and the rear housing.

15. A directional flow control device, comprising:
a housing, comprising:
an inlet end,
a discharge end,
a shell that has a cavity,
a front housing, received in the cavity of the shell and comprising an inlet bore, and
a rear housing, received in the cavity of the shell and comprising a first outlet bore and a second outlet bore, wherein
the front housing and the rear housing are aligned in the cavity along a longitudinal axis, extending between the inlet end and the discharge end;
stator magnets, coupled to at least one of the front housing or the rear housing;
a control module, coupled to the stator magnets to energize the stator magnets; and
a flow deflector that comprises a hub, having a front end and a rear end,
wherein
the flow deflector further comprises rotor magnets, arranged around an outer perimeter of the hub,
the flow deflector further comprises a flow channel therethrough,
the flow channel has an intake bore at the front end of the hub and a discharge bore at the rear end of the hub,
the flow deflector is positioned between the front housing and the rear housing such that the rotor magnets are aligned with the stator magnets,
the intake bore is in flow communication with the inlet bores,
the hub is rotatable relative to the front housing and the rear housing about a rotation axis, parallel to the longitudinal axis,
the hub is configured to rotate about the rotation axis between a first discharge position and a second discharge position based on energization of the stator magnets by the control module, the discharge bore is in fluid communication with the first outlet bore when the hub is at the first discharge position, and the discharge bore is in fluid communication with the second outlet bore when the hub is at the second discharge position.

16. The directional flow control device of claim 15, wherein the flow deflector is rotatable within the housing without requiring a shaft connection between the flow deflector and the housing.

17. The directional flow control device of claim 15, wherein:

the intake bore extends along an intake bore axis, and the discharge bore extends along a discharge bore axis, which has a fluid path change angle from 10° to 45° relative to the intake bore axis.

18. The directional flow control device of claim 15, wherein the flow deflector is rotatable within the housing without using a gear to rotate the flow deflector.

19. A method of using a directional flow control device, the directional flow control device comprising a housing and a flow deflector, received in the housing, the flow deflector comprising a front end and a rear end, the flow deflector further comprising an intake bore at the front end and a discharge bore at the rear end, the flow deflector further comprising a flow channel, extending between the intake bore and the discharge bore, the housing comprising a shell with a cavity, the housing further comprising a front housing, received in the cavity of the shell, the front housing comprising a front pocket and an inlet bore, the housing further comprising a rear housing, received in the cavity of the shell, and the rear housing comprising a rear pocket, a first outlet bore, and a second outlet bore, the housing further comprising stator magnets, the front end of the flow deflector positioned in the front pocket, the rear end of the flow deflector positioned in the rear pocket, the flow deflector further comprising rotor magnets, the rotor magnets and the stator magnets being contained within the shell, the directional flow control device further comprising a control circuit, operatively coupled to the stator magnets, the method comprising:

operating the control circuit to energize the stator magnets to rotate the rotor magnets and the flow deflector in the front pocket and the rear pocket of the housing to a first discharge position, wherein the discharge bore is in flow communication with the first outlet bore of the rear housing when the flow deflector is in the first discharge position; and operating the control circuit to energize the stator magnets to rotate the rotor magnets and the flow deflector in the front pocket and the rear pocket of the housing to a second discharge position, wherein the discharge bore is in flow communication with the second outlet bore of the rear housing when the flow deflector is in the second discharge position.

20. The method of claim 19, further comprising operating the control circuit to energize the stator magnets to rotate the rotor magnets and the flow deflector in the housing to a shut-off position, wherein the discharge bore is in flow communication with neither the first outlet bore nor the second outlet bore when the flow deflector is in the shut-off position.

* * * * *